United States Patent [19]
Okayama

[11] Patent Number: 6,154,587
[45] Date of Patent: Nov. 28, 2000

[54] OPTICAL CROSS CONNECTOR APPARATUS

[75] Inventor: Hideaki Okayama, Tokyo, Japan

[73] Assignee: Oki Electric Industry Co., Ltd., Tokyo, Japan

[21] Appl. No.: 09/044,187

[22] Filed: Mar. 19, 1998

[30] Foreign Application Priority Data

Mar. 21, 1997 [JP] Japan .................................. 9-068606
May 7, 1997 [JP] Japan .................................. 9-117185

[51] Int. Cl.$^7$ .................................................. G02B 6/28
[52] U.S. Cl. ............................................ 385/24; 359/127
[58] Field of Search ............................... 385/24, 15–17; 359/127, 128

[56] References Cited

U.S. PATENT DOCUMENTS

| | | | |
|---|---|---|---|
| 5,623,356 | 4/1997 | Kaminow et al. ...................... | 359/123 |
| 5,647,035 | 7/1997 | Cadeddu et al. ......................... | 385/24 |
| 5,717,795 | 2/1998 | Sharma et al. ........................... | 385/24 |
| 5,937,116 | 8/1999 | Seto ......................................... | 385/24 |
| 5,937,117 | 8/1999 | Ishida et al. ............................. | 385/24 |
| 5,953,141 | 9/1999 | Liu et al. ................................. | 359/124 |

FOREIGN PATENT DOCUMENTS 2509332  12/1990  Japan .

OTHER PUBLICATIONS

Okamoto et al., "Optical Path Cross–Connect Node Architectures for Photonic Transport Network", Journal of Lihgtwave Technology, vol. 14, No. 6, pp. 1410–1422, Jun. 1996.

Optical Path Cross–Connect Node Architectures for Photonic Transport Network, *Journal of Network Technology*, vol. 14, pp. 1410–1422, Jun. 1996.

Current Developments and Trends and Photonic Transport Network Technology, By Kenichi Sato, No. 194, pp. 75–79, (No Date).

Developments in Optical Cross–Connect Technology, By Minoru Shikada, No. 194, pp. 100–105, (No Date).

Wireless 97 The Ninth Annual International Conference on Wireless Communications, IEEE Communications Magazine, Dec. 1996.

*Primary Examiner*—John D. Lee
*Assistant Examiner*—Michelle R. Connelly-Cushwa
*Attorney, Agent, or Firm*—Wenderoth, Lind & Ponack, L.L.P.

[57]  ABSTRACT

The optical communications system is capable of increasing its scale with the use of a fewer number of wavelengths and is flexible in allowing the topology to be altered. The optical cross connector minimizes optical loss and crosstalk. The optical communications system includes a plurality of optical communications networks. The optical communications network includes a group of nodes and optical fibers connecting the nodes to each other. The optical fibers include existing optical fibers forming a predetermined topology and auxiliary optical fibers provided for altering the topology with the help of a path switching function of each node. A selected one of the nodes in each optical communications network is connected to a switchboard by one of links. The switchboard is connected at the other end to a group of subscribers. The optical cross connector includes input side units, output side units, and an optical connecter connected between the input side units and the output side units. The input side units separate an optical signal into wavelength channels which are then distributed to first output ports. The optical connector connects the first output ports of the input side units to corresponding second input ports of the output side units, respectively. The output side units combine the wavelength channels of the optical signal received at their second input ports before transmitting out from second output ports.

8 Claims, 15 Drawing Sheets

OPTICAL CROSS CONNECTOR APPARATUS

BACKGROUND OF THE INVENTION

The present invention relates to an optical communications system and an optical cross connector apparatus suited for use in the optical communications system.

One of conventional optical communications systems is disclosed in the form of an optical communications network which comprises a plurality of nodes connected to each other by optical fibers for transmission of wavelength multiplexed light, each the node having an optical cross connector for switching the path of light signal according to its wavelength as stated in Appendix 1 (0 plus E, No. 194, pp. 75–79, and pp. 100–105, including FIG. 3 on p. 77).

In such a conventional optical communications network, different wavelengths of light are split to pass their respective paths. For example, a wavelength lambda n of the light is destined to a particular node n in the optical communications network.

For developing a large scale optical communications system using a plurality of the conventional optical communications networks, it is necessary to increase the number of nodes and the number of wavelengths to be multiplexed. When the number of wavelengths to be multiplexed is increased, the implementation of relevant components or arrangement has to be modified.

It is known that the number of wavelengths to be multiplexed is substantially 32 at maximum in the latest technology. The more the number of wavelengths to be multiplexed, the more the number of light sources and wavelength filters are needed for optical signal processing. Also, an arrangement of the nodes becomes troublesome. With the use of the principle of such conventional optical communications networks, the development of a large scale optical communications system will thus be critical.

The foregoing drawbacks about the number of wavelengths to be multiplexed and the arrangement of the system are common to not only wavelength multiplexing but also other multiplexing methods including packet multiplexing and subcarrier multiplexing. They may also be accounted when the nodes are connected by bundles of optical fibers in a space multiplexing communications system.

It may be probable to develop a fair-scaled optical communications system with the conventional optical communications networks where both the number of nodes and the number of wavelengths to be multiplexed are increased. However, increasing the number of nodes and the number of wavelengths to be multiplexed will hardly contribute to the flexibility of changing a topology in the optical communications network.

Each node in the conventional optical communications network includes an optical cross connector for switching the path of light depending on its wavelength. Such a traditional optical cross connector is disclosed in Appendix 2, "Journal of lightwave technology", Vol. 14, No. 6, pp. 1410–1421, July in 1996.

The traditional optical cross connector (See FIG. 9 on p. 1417 of Appendix 2) comprises a plurality of units. The action of the traditional optical cross connector includes: 1. separating a wavelength multiplexed light signal (referred to as wavelength multiplexed optical signal) received by the input port of a unit into wavelengths (or wavelength channels) with a demultiplexer element; 2. directing each wavelength of the light signal to a first corresponding intermediate port; 3. combining a number of wavelengths of the light signal supplied from their respective first intermediate ports with a first star coupler to have a composite light signal which is delivered to a second intermediate port; 4. directing the composite light signal produced by the first star coupler to a second star coupler provided corresponding to the second intermediate ports for further combining; and 5. releasing a resultant combined light signal from an output port allocated to each the second star coupler. Accordingly, each wavelength of the light signal received by the input port of each unit can successfully be distributed to a desired one of the output ports.

In the traditional optical cross connector disclosed in Appendix 2, the light signal runs across the two, first and second, start couplers while being transferred from the input port to the output port. It is known that loss of the light signal in the star coupler is not negligible. The more the number of the input ports of the star coupler or the number of light signal components to be combined by the star coupler, the lower the intensity of a light signal output will be released from the output of the star coupler. When the number of wavelength channels is increased, the number of the first intermediate ports in the traditional optical cross connector has to be increased. Hence, the number of the inputs of the first and the second star coupler will be increased. Also, the higher the number of the input ports or the number of the units, the higher the number of the inputs of the second star coupler is needed. As the result, increasing the number of the wavelength channels or the input ports will decline the intensity of a light signal output.

The light signal released from the output port is a wavelength multiplexed signal produced by the second star coupler. The second star coupler is however liable to add the light signal output with a crosstalk generated by an optical switch provided at the preceding stage of the first star coupler. It is thus difficult in the traditional cross connector to prevent declination of the quality of the signal output due to the crosstalk over a wavelength. For compensation, the traditional optical cross connector is provided with a particular type of the optical switches having a higher optical quenching ratio (which can be fabricated and operated only with much difficulty).

SUMMARY OF THE INVENTION

The present invention is directed towards eliminating the foregoing drawbacks of a conventional optical communications system and its object is to provide an optical communications system capable of increasing the overall scale with the use of wavelengths of light to be multiplexed of which number is within a range generally accepted by the current technology and flexible for allowing a change of the topology. Another object of the present invention is to provide a novel, improved optical cross connector in which the loss in a light signal is minimized and the generation of crosstalk is suppressed.

According to the present invention, an optical communications system for performing communications over an optical signal of a predetermined multiplexed format is provided comprising:

1. a plurality of optical communications networks, each including a group of nodes having a signal path switching function and optical fibers connected between the nodes; and
2. at least one or more switchboards connected at one end to at least two or more of the optical communications networks via at least one node for each optical communications network, and at the other end to a subscriber(s) for selectively communicating the subscriber with any of the optical communications networks, 3. said optical fibers of the optical communications network including (a) existing optical fibers which constitute a topology assigned to the optical communications network and (b) auxiliary optical fibers provided for changing the topology upon being enabled by the signal path switching function of their corresponding node.

The optical communications system of the present invention is explained referring to its simplified arrangement shown in FIG. 1.

There are illustrated two optical communications networks 11 and 13 in the optical communications system. Each of the two optical communication networks 11 and 13 includes four nodes 11a to 11d (13a to 13d) connected in a ring configuration. The nodes are interconnected by optical fibers 15a suited for transmitting an optical signal of a specific multiplexed format (wavelength multiplexed in this case). The ring of the optical fibers 15a is made of existing optical fibers (denoted by the thick real lines in FIG. 1) which is in use. In addition, the nodes are connected by auxiliary fibers 15b (denoted by the thick dotted lines in FIG. 1).

It is assumed that when a wavelength lambda 1 of the optical signal is supplied to the optical communications network 11, it is received by the node 11a. Similarly, a wavelength lambda 2 of the optical signal is received by the node 11b, a wavelength lambda 3 is received by the node 11c, and a wavelength lambda 4 is received by the node 11d. In the optical communications network 13, the wavelength lambda of the optical signal is received by the node 13a, the wavelength lambda 2 is received by the node 13b, the wavelength lambda 3 is received by the node 13c, and the wavelength lambda 4 is received by the node 13d.

A number of switchboards 17 are connected to the two optical communications networks 11 and 13 in such a manner that they can access to the optical communications system according to the spirit of the present invention. In the system shown in FIG. 1, the switchboard 17 is connected by a pair of links 19a, 19b, 19c, or 19d to the corresponding node in each of the two optical communications networks 11 and 13. The switchboard 17 is connected at the other end to subscribers 21x and/or a local communications medium or network 21y (referred hereinafter to as subscribers 21 denoted by 21a to 21d in FIG. 1).

The subscribers 21 are allowed to communicate with each of the two optical communications networks 11 and 13 through the four nodes. The subscribers 21 can access to both the optical communications networks 11 and 13 by the switching action of the switchboard 17. This permits the subscribers 21 to communicate with eight nodes selectively. While the access to the eight nodes is selectively made, the number of wavelengths to be multiplexed is four in each of the optical communications networks 11 and 13. Also, the number of the nodes which can be accessed by the subscribers 21 is increased when one or more extra optical communications networks identical in construction to the optical communications networks 11 and 13 are added with their corresponding nodes connected through the relevant switchboards 17. With the extra optical communications networks added, the number of wavelengths to be multiplexed for the optical communications networks 11 and 13 is unchanged, four. A large scale of the optical communications system is thus feasible without increasing the number of wavelength to be multiplexed.

This advantage of the present invention will clearly be understood when comparing with the conventional system where when the subscribers 21 want to communicate with eight nodes through one optical communications network, the system has to satisfy that each of its optical communications networks includes eight nodes and the number of wavelengths to be multiplexed is eight.

In the optical communications system of the present invention, the topology of the optical communications networks 11 and 13 can easily be altered by shifting corresponding ones of the auxiliary optical fibers to their enable state. For altering the topology, the existing optical fibers may remain intact or some may be turned to auxiliary optical fibers depending on its configuration. The optical communications network 11 shown in FIG. 1 can be shifted to another ring topology, for example, consisting of the nodes 11a, 11c, and 11d when the auxiliary optical fiber between the two nodes 11a and 11c has been enabled and the existing optical fibers between the nodes 11a and 11b and between the nodes 11b and 11c have been disabled and turned to auxiliary optical fibers. It is hence apparent that another advantage of the present invention is to provide a flexibility for altering the topology of each optical communications network.

The present system can be applied not only to the wavelength multiplexing communication system but also to the other multiplexing communication systems. For example, in case of the packet multiplexing communication system, a large scale optical communication system can be provided only by few number of leader type. Further, in case of space multiplexing communication system, another large scale optical communication system can be provided by using bundles of optical fibers.

The optical communications system of the present invention is capable of increasing the overall scale with the use of wavelengths of light to be multiplexed of which number is within a range generally accepted by the current technology and is flexible for allowing a change of the topology.

Preferably, each of the nodes in the optical communications system of the present invention may comprise an optical cross connector and an add/drop unit.

The optical cross connector is provided for switching the path of the multiplexed optical signal at the node as will be described later in more detail. The shifting from the existing optical fiber to an auxiliary optical fiber or vice versa can easily be made by the action of the optical cross connector.

The add/drop unit is connected between the optical cross connector and the optical switchboard for receiving from the subscriber an optical signal of the multiplexed format which is then transmitted to the optical cross connector and distributing to the subscriber a particular component of the multiplexed optical signal assigned to the node. Accordingly, the transmission of the optical signal between the optical communications network and the switchboard can be facilitated by the add/drop unit.

Preferably, the optical cross connector in the optical communications system of the present invention may be adapted for selecting the path of the optical signal according to its switching factor defined by the multiplexed format. This allows each component of the multiplexed optical signal to be routed separately. The multiplexed format is typically of wavelength multiplexing, packet multiplexing, subcarrier multiplexing, or their combination. The switching factor is a wavelength in the wavelength multiplexing, a header in the packet multiplexing, or a subcarrier in the subcarrier multiplexing.

Preferably, the optical cross connector in the optical communications system of the present invention may comprise a plurality of demultiplexer elements, a plurality of multiplexer elements, a group of output ports for the demultiplexer elements, a group of input ports for the multiplexer elements, and an optical matrix switch for controlling the connection with the add/drop unit.

In the optical cross connector using the demultiplexer elements and the multiplexer elements, the existing and auxiliary optical fibers at the input side of the node are connected to their corresponding demultiplexer elements and the existing and auxiliary optical fibers at the output side are connected to their corresponding demultiplexer elements without doubling the connection (See FIG. 3). The optical matrix switch is provided for routing components of the multiplexed optical signal through their optimum paths. Accordingly, the optical communications system of the present invention permits the optical signal of a wavelength multiplexed format to be handled favorably.

It is also possible that the optical cross connector in the optical communications system of the present invention is an M×N optical matrix switch having input ports and output ports thereof so that the add/drop unit is connected between one of the input ports and one of the output ports. This contributes to the simple construction of the optical cross connector.

Preferably, the optical communications network in the optical communications system of the present invention may have a ring or bus network configuration. Accordingly, the optical communications network will be controlled with much ease as compared with a mesh network configuration.

An optical cross connector according to the present invention is provided for selecting the path of an optical signal of a wavelength multiplexed format according to its wavelength channel and, in particular, comprises:

1. an input side unit having (a) a first input port, (b) first output ports, (c) a demultiplexer element for separating the wavelength multiplexed optical signal into different wavelength channels, and (d) a first optical switch for selectively distributing the wavelength channels of the optical signal to the first output ports respectively; and
2. an output side unit having (e) second input ports, (f) a second output port, (g) third output ports, (h) a second optical switch for selectively distributing the wavelength channels of the optical signal received by the second input ports to the third output ports respectively, and (i) a multiplexer, element for combining the wavelength channels supplied from their respective third output ports and delivering them through the second output port, in which
3. the first output ports are connected by optical connecting means to their corresponding second input ports respectively.

The optical signal of the wavelength multiplexed format is received by the first input port of the demultiplexer element and separated into wavelength channels. The wavelength channels of the optical signal are distributed by the action of the first optical switch to their respective first output ports. More specifically, each wavelength of the wavelength multiplexed signal is split to wavelength channels which are selectively transmitted to the first output ports respectively.

The first output ports are connected by the optical connecting means to the corresponding second input ports on a one-to-one basis. The wavelength channels of the optical signal are thus supplied to their respective second input ports.

The wavelength channels of the optical signal transmitted through the optical connecting means are received at the second input ports and switched by the action of the second optical switch to the corresponding third output ports. The wavelength channels from the third output ports are then mixed by the multiplexer element and released from the second output port. Accordingly, different components of the optical signal received at their respective second input ports are combined and delivered from the second output port.

More particularly, the optical cross connector allows the wavelength multiplexed optical signal to be transmitted to an optimum route by switching according to its wavelength. The connector employs no star coupler, thus being prevented from distribution loss of the light energy which is inevitable in the conventional construction and permitting the optical loss to be reduced relatively.

Also, any crosstalk generated in the input side unit will successfully be eliminated in the output side unit and its adverse effect will be minimized.

Preferably, in the optical cross connector of the present invention, the first optical switch may comprise a number of first optical switch stages corresponding to the number of wavelength channels and a first optical link provided between the first optical switch stages and the first output ports. The first optical link incorporates optical paths extending between the first optical switch stages and the first output ports. The first optical switch stages is adapted for selecting one of the paths in the first optical link to transmit each wavelength channel of the optical signal.

The first optical switch includes the first optical switch stages corresponding to the number of wavelength channels of the optical signal. The wavelength channels of the optical signal split by the demultiplexer element is transmitted to the first optical switch where they are routed by the action of the first optical switch stages. The optical paths in the first optical link are connected between the first output ports and the first optical switch stages. Each particular wavelength channel is routed by the action of the first optical switch stages to run through its optimum path in the first optical link to its corresponding first output port. Accordingly, the wavelength channels of the optical signal are selectively distributed to their respective first output ports.

The first output ports are connected to a number of paths corresponding to the number of wavelength channels. The optical connecting means may be a fiber optic ribbon, fiber optic tape, or a bundle of optical fibers. Accordingly, the optical cross connector can be assembled with much ease.

Preferably, the second optical switch in the optical cross connector of the present invention may comprise a number of second optical switch stages corresponding to the number of wavelength channels and a second optical link provided between the second optical switch stages and the second input ports. The second optical link incorporates optical paths for transmitting the wavelength channels of the optical signal to the corresponding second optical switch stages which in turn selects and delivers the wavelength channels from the third output ports.

The optical paths of the second optical link extend from the second input ports to the second optical switch stages. The number of the second optical switch stages is identical to that of the wavelength channels of the optical signal. This allows each wavelength channel of the optical signal to be received at its corresponding second input port and transmitted to its corresponding second optical switch stage. The wavelength channel is then routed by the action of the second optical switch stage to the third output port. Accordingly, the wavelength channels of the optical signal are selectively distributed to the corresponding third output ports.

The second input ports are connected to a number of optical paths corresponding to the number of wavelength channels. The optical connecting means may be a fiber optic ribbon, a fiber optic tape, or a bundle of optical fibers. Accordingly, the optical cross connector can be assembled with much ease.

Preferably, in the optical cross connector of the present invention, a wavelength converter means may be provided in the optical connecting means. This allows the wavelength channel to be shifted in the optical connecting means.

Preferably, the wavelength converter in the optical cross connector of the present invention may comprise a wavelength router for switching the wavelength channels of the optical signal transmitted across the optical connecting means to their respective routes and a group of wavelength converter elements for converting the wavelength channels of the optical signal routed by the wavelength router to fixed wavelengths.

Accordingly, the wavelength channels of the optical signal are routed by the action of the wavelength router to run their optimum paths in the optical connecting means. The paths are optical paths defined in the optical connecting means. More particularly, through a selecting action of the wavelength router, each wavelength channel of the optical signal can thus be transmitted not to its corresponding one but to another of the second input ports. Also, the wavelength channel of which route is determined by the wavelength router is converted by the wavelength converter means to a fixed wavelength channel. Accordingly, the wavelength channel of the optical signal can be shifted.

Preferably, the wavelength router in the optical cross connector of the present invention may comprise a star coupler for multiplexing the wavelengths of each channel of the optical signal transmitted across the optical connecting means and a group of optical wavelength filters for passing desired wavelength channels of the multiplexed optical signal supplied from the star coupler.

In action, the star coupler is supplied at its input with the different wavelengths of the optical signal which are then combined. As the result, the wavelength multiplexed optical signal of each wavelength channel is released from the corresponding output port of the star coupler. The optical wavelength filter selects and passes a particular wavelength channel of the multiplexed optical signal. The optical wavelength filters are connected to their respective output ports of the star coupler. Accordingly, the path of the optical signal across the optical connecting means can be selected according to its wavelength channel.

Preferably, the wavelength router in the optical cross connector of the present invention may be an optical matrix switch. This also allows the path of the optical signal in the optical connecting means to be selected depending on the wavelength channel. In addition, no star coupler is used and the distribution loss of light energy will be minimized.

Preferably, the optical connecting means in the optical cross connector of the present invention may be a bundle of optical fibers.

As described previously, different wavelength channels of the optical signal released from their respective first output ports are transmitted to the corresponding second input ports via the optical connecting means which is thus preferably a fiber optic ribbon, a fiber optic tape, or a bundle of optical fibers. This will facilitate the assembly of the optical cross connector.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

PREFERRED EMBODIMENTS OF THE INVENTION

Preferred embodiments of the present invention will be described referring to the accompanying drawings. Throughout the description and the drawings, like components having particular functions and constructions are denoted by like numerals and their explanation will not be repeated.

It is noted that the drawings schematically illustrate arrangements, layouts, and connections of the components for ease of the description. Also, various items in the following description including figures and parameters are exemplary requirements. It would thus be understood that the present invention is not limited to the arrangements, layouts, connection, and items stated in the following description and the accompanying drawings.

First Embodiment

Figure 2:
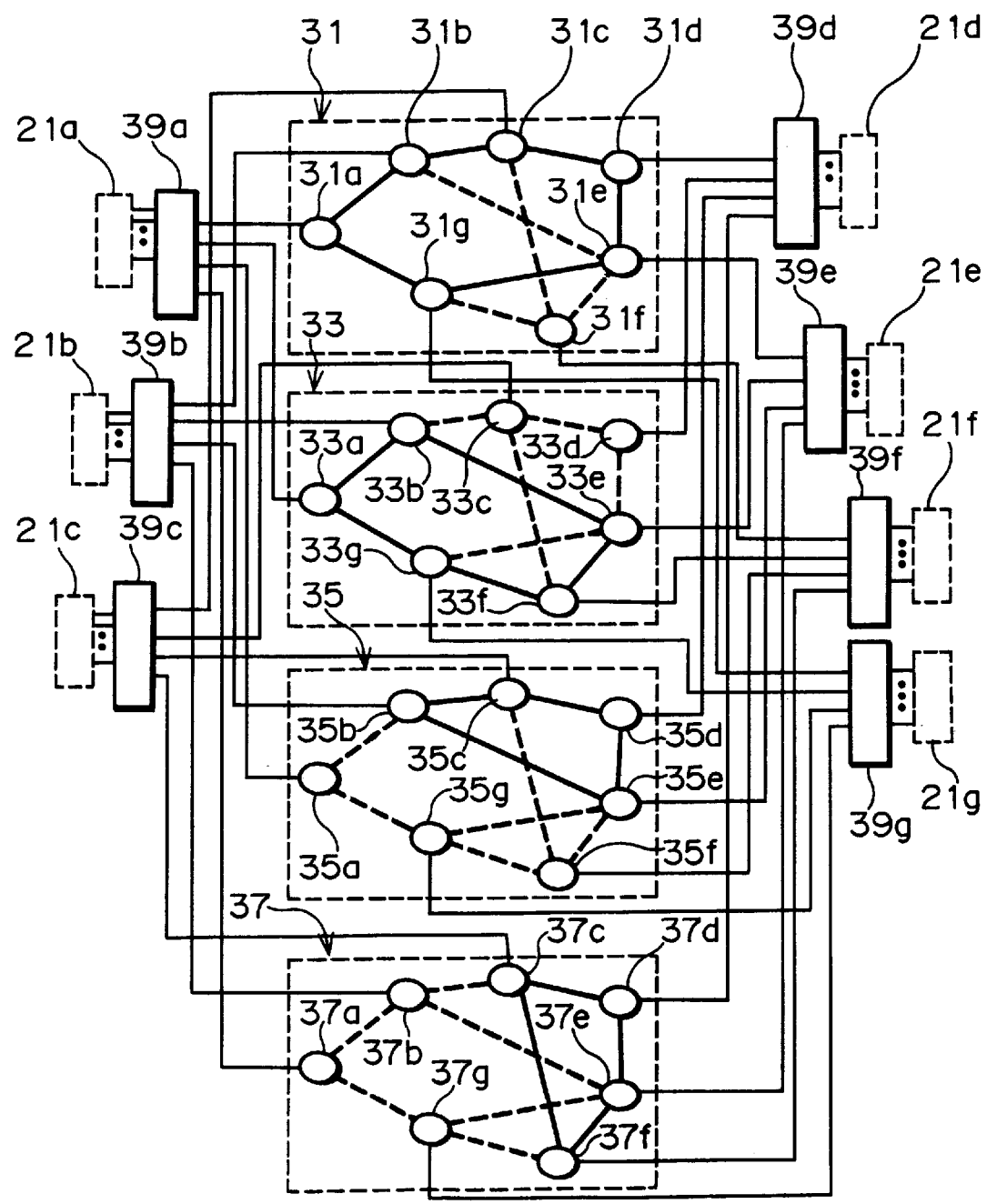
FIG. 2 is an explanatory view of a first embodiment of the present invention.

FIG. 2 is an explanatory view of an optical communications system showing a first embodiment of the present invention. The optical communications system of the first embodiment shown in FIG. 2 comprises, for example, four, first to fourth, optical communications networks 31, 33, 35, and 37. Each of the first 31 to the fourth optical communications network 37 includes seven nodes. More specifically, the first optical communications network 31 includes nodes 31a to 31g, the second optical communications network 33 includes nodes 33a to 33g, the third optical communications network 35 includes nodes 35a to 35g, and the fourth optical communications network 37 includes nodes 37a to 37g. The node is provided for distributing (or switching the path of) optical signals, receiving optical signals from subscribers (or adding to the optical communications) to the optical communication network, and delivering optical signal from the optical communication network to the subscribers (or dropping from the network). The construction of the node will be described not now but later in more detail.

It is assumed that the nodes available currently for use are different in number between the first 31 to the fourth optical communications network 37. In particular, the first optical communications network 31 has six of the nodes 31a, 31b, 31c, 31d, 31e, and 31g available for carrying out communications. Similarly, the second optical communications network 33 has the five nodes 33a, 33b, 33e, 33f, and 33g available for use while the third optical communications network 35 has the four nodes 35b, 35c, 35d, and 35e available for use. The fourth optical communications network 37 has the four nodes 37c, 37d, 37e, and 37f available for use. The nodes in each of the optical communications networks 31, 33, 35, and 37 are linked in a ring network form.

The assignment of the nodes to the condition available for use in the optical communications networks 31, 33, 35, and 37 may be determined depending on the design or application of the optical communications system. It is also possible to assign all the nodes to the available condition in any of the optical communications networks 31, 33, 35, and 37. When the nodes are desired to be in the available condition, they may be connected in a succession with the use of optical fibers. The connection between the node and the optical fibers should be controlled by a communication path switching function of the node (as will be described later in more detail referring to FIG. 3). It is assumed that the optical fibers connected to the nodes are referred to as existing optical fibers 15a (denoted by the thick real line in FIG. 2). The optical fibers which are disconnected from the nodes and, when desired, can selectively be connected by the action of the communication path switching function (described later) of the node are referred to as auxiliary optical fibers 15b (denoted by the thick broken line in FIG. 2). A topology of each optical communications network can successfully be altered by shifting the auxiliary optical fibers to the existing optical fibers.

In the embodiment of the present invention, the nodes 31a, 33a, 35a, and 37a are grouped and allocated to one station, the nodes 31b, 33b, 35b, and 37b to another, . . . , and the nodes 31g, 33g, 35g, and 37g to a further station.

The interconnection of the optical fibers between the nodes in each optical communications network may be designed depending on the application. Also, the number of the auxiliary optical fibers joined to one node may be arbitrary. It is noted that the optical communications networks 31, 33, 35, and 37 shown in FIG. 2 are identical in the interconnection of the optical fibers between the nodes.

Each of the existing and auxiliary optical fibers connected between the nodes typically comprises a single optical fiber for transmission of a wavelengths multiplexed signal. However, the existing and auxiliary optical fibers may consist of a bundle of optical fibers suited for space-division multiplexing.

In the optical communications system of the first embodiment, seven switches (39a to 39g in FIG. 2) are provided, each connected at one end to a subscriber 21 (21a to 21g in FIG. 2) and at the other end to at least two nodes of their two respective ones of the optical communications networks 31, 33, 35, and 37 so that it can selectively communicate the subscriber with one of the two nodes connected at the other end thereof.

More particularly, each of the switches 39a to 39g is connected to a group of the nodes of its corresponding station (for example, 31a, 33a, 35a, and 37a). This allows, for example, the switch 39a to selectively communicate the subscriber 21a with one of the nodes 31a, 33a, 35a, and 37a. In the system shown in FIG. 2, as the node 35a is connected by the auxiliary optical fibers to the nodes 35b and 35g, the subscribed 21a cannot be communicated with all the other nodes 35b to 35g in the optical communications network 35. Only when the auxiliary optical fiber extending from the node 35a to the node 35b or 35g is turned to the existing optical fiber, it can allow the subscriber 21a to communicate with the other nodes 35b to 35g in the optical communications network 35.

Figure 3A:
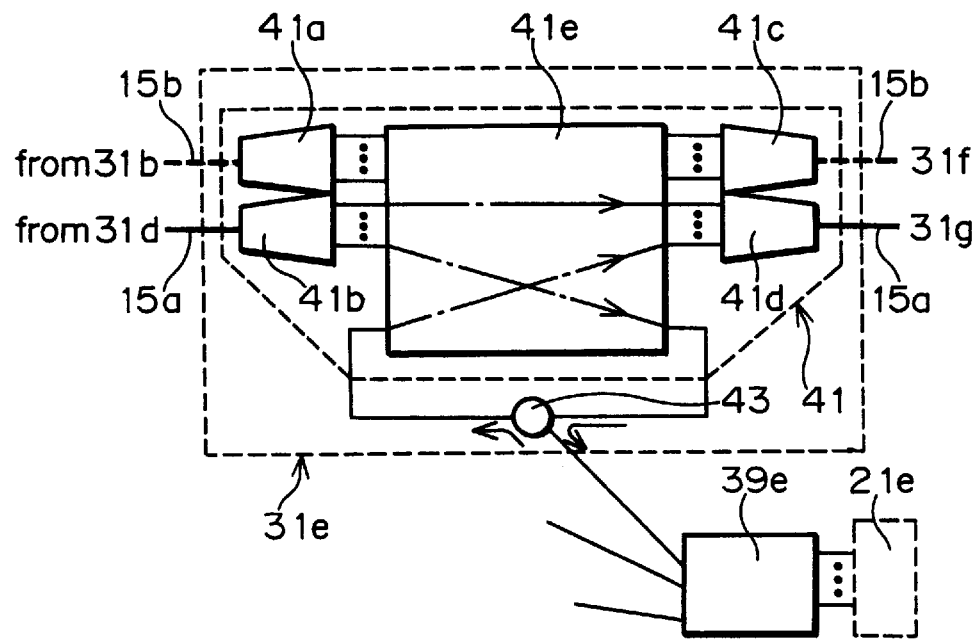
FIGS. 3(A) and 3(B) are an explanatory view of an arrangement of a node used in the first embodiment.
Figure 3B:
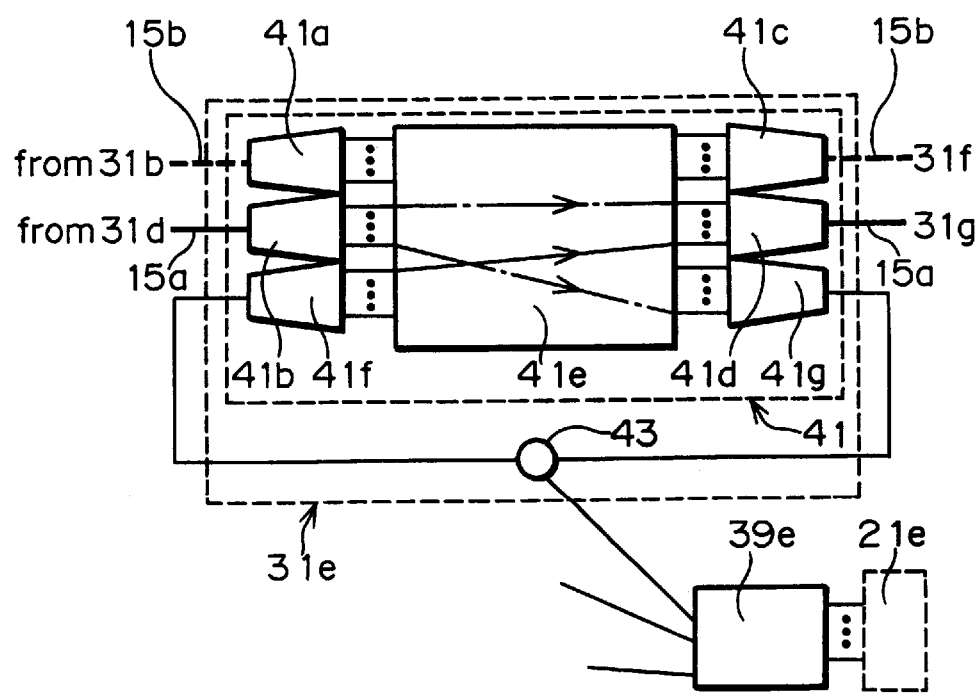

The construction of the node in each of the optical communications networks 31, 33, 35, and 37 is now explained referring to the node 31e in conjunction with FIGS. 3(A) and 3(B). FIG. 3(A) is an explanatory view of a first arrangement of the node 31e and FIG. 3(B) is an explanatory view of a second arrangement of the node 31e. For ease of explanation of the connection between the node 31e and the switch 39e, the switch 39e and the subscriber 21e are also illustrated.

The node 31e shown in FIG. 3 includes an optical cross connector 41 and an add/drop unit 43.

The optical cross connector 41 performs switching the communication path of a multiplexed optical signal. The add/drop unit 43 receives from the subscriber 21 a predetermined type of the multiplexed signal assigned to the cross connector 41 and delivers a particular component of the multiplexed optical signal defined by the node.

The optical cross connector 41 comprises two, first and second, demultiplexer elements 41a and 41b, two, first and second, multiplexer elements 41c and 41d, and an optical matrix switch 41e for controlling the connection of the add/drop unit 43 with the output terminals of the demultiplexer elements 41a and 41b and the input terminals of the multiplexer elements 41c and 41d.

It is now assumed that 1. the input terminal of the first demultiplexer element 41a is connected by the auxiliary optical fiber 15b (to the node 31b), 2. the input terminal of the second demultiplexer element 41b is connected by the existing optical fiber 15a (to the node 31d), 3. the output terminal of the first multiplexer 41c is connected by the auxiliary optical fiber 15b (to the node 31f), and 4. the output terminal of the second multiplexer element 41d is connected by the existing optical fiber 15a (to the node 31g). The optical matrix switch 41e is operated to enable the communication between the second demultiplexer element 41b and the second multiplexer element 41d. The optical matrix switch 41e is designed for connecting a wavelength lambda n of the optical signal to the add/drop unit 43.

When the optical matrix switch 41e communicates between the second demultiplexer element 41b and the first multiplexer element 41c, the optical fiber connected to the first multiplexer element 41c is turned to the existing optical fiber and the existing optical fiber connected to the second demultiplexer element 41d is turned to the auxiliary optical fiber. Accordingly, the node 31e is connected to the node 31f. Then, the optical fiber between the node 31f and 31g is enabled using the optical matrix switch (not shown) in the node 31f. As a result, the topology of the first optical communications network 31 can be changed to another form in which the nodes 31a, 31b, 31c, 31d, 31e, 31f, and 31g are connected in a ring.

Simultaneously, the add/drop unit 43 transmits the wavelength lambda n or a predetermined packet or channel of the optical signal to the switch 39e. The switch 39e in turn delivers the optical signal to the subscriber 21e who requests to start communicating. When an optical signal is provided from the subscriber 21e via the switch 39e to the add/drop unit 43, its component compatible with the multiplexing method employed in the optical communications system is allowed by the add/drop unit 43 to enter the optical matrix switch 41e. For example, a wavelength lambda 3 of the optical multiplexed signal is accepted by the add/drop unit 43 to pass to the optical matrix switch 41e. In this embodiment, the optical matrix switch 41e transmits the optical signal input to the second multiplexer element 41d.

For allowing a type of the optical signal compatible with the multiplexing method of the optical communications system to be transmitted via the add/drop unit 43 to the optical matrix switch 41e, a signal generator for producing the type of the optical signal may be provided in either the add/drop unit 43 or the subscriber 21e. Such a signal generator may be any optical signal generator apparatus including a group of light sources (e.g. semiconductor lasers) for emitting desired wavelengths of the optical signal compatible with the multiplexing method.

In the second arrangement of the node shown in FIG. 3(B), the output of the optical matrix switch 41e is connected via a multiplexer element 41g to the add/drop unit 43 which transmits an optical signal input via a demultiplexer element 41f to the optical matrix switch 41e.

The second arrangement unlike the first arrangement allows a plurality of wavelengths of the optical signal to be delivered to and received from the subscriber 21e for its optical communications network.

The optical communications system of the first embodiment has six of the nodes available for use in the first optical communications network 31 for performing communications with the use of six different wavelengths of the optical signal which can be routed through each node. Also, it permits the second optical communications network 33 to pass five different wavelengths of the optical signal for routing each node and both the third 35 and the fourth communications network 37 to use four different wavelengths of the optical signal for routing each node. Since the four optical communications networks 31, 33, 35, and 37 are isolated from each other in construction, a particular wavelength of the optical signal can be used in the four optical communications networks 31, 33, 35, and 37 respectively without interfering each other. Also, the subscriber 21a is allowed to communicate the six nodes of the first optical communications network 31, the five nodes of the second optical communications network 33, the four nodes of the third optical communications network 35, and the four nodes of the fourth optical communications network 37. It is apparent that a desired number of the available nodes can be provided by changing the topology of one or more of the optical communications networks. In the arrangement in FIG. 2, the subscriber 21a can be connected up to 4×7=28 of the nodes.

For example, when the topology of each of the first to fourth optical communications networks 31, 33, 35, and 37 is shifted to a ring topology of seven nodes with each the switch provided for a group of the nodes of their respective networks, connections may be implemented between 7×7= 49 of the nodes. In that case, an optical signal multiplexed with seven different wavelengths can be used. The topology may be changed when the auxiliary optical fibers are shifted to the existing optical fibers by the communication path switching function of (the optical cross connector 41 of) each corresponding node.

Second Embodiment

As described previously, the communication path of the optical signal in the optical cross connector 41 of the first embodiment is switched according to a wavelength of the signal. Different wavelengths of the optical signal are separated from each other by the demultiplexer elements 41a and 41b (FIG. 3) and selectively transmitted by the switching action of the optical matrix switch 41e. It is also possible to carry out separation of the multiplexed optical signal (to release a specific wavelength) according to an optical signal separation factor determined by the multiplexing method of an add/drop unit while the optical signal is transmitted through the optical cross connector without being split. The second embodiment involves such a separation of the multiplexed optical signal.

Figure 4:
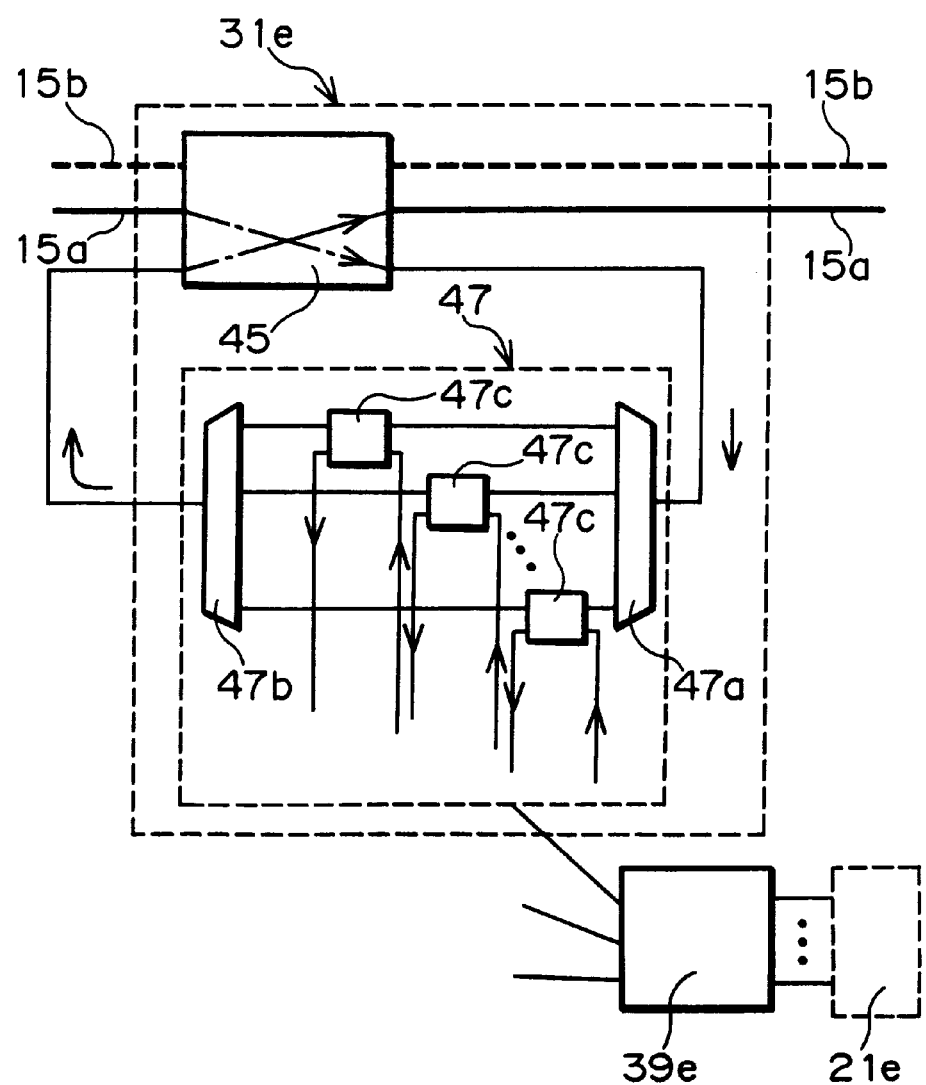
FIG. 4 is an explanatory view of a second embodiment of the present invention showing a first arrangement where a node is mainly focused.

FIG. 4 is an explanatory view showing a first arrangement of the second embodiment, in which the nodes are concerned. The explanation goes with a node 31e. The existing and auxiliary optical fibers are denoted by the same manner as shown in FIG. 3.

The node 31e of the second embodiment includes an optical cross connector provided in the form of an M×N optical matrix switch 45. An add/drop unit 47 (described later in more detail) is connected between one of inputs of and one of outputs of the M×N optical matrix switch 45. The M×N optical matrix switch 45 is connected at its other inputs to the existing optical fiber 15a and the auxiliary optical fiber 15b and at its other outputs to the existing optical fiber 15a and the auxiliary optical fiber 15b.

The add/drop unit 47 comprises a demultiplexer element 47a, a multiplexer element 47b, a group of optical switches 47c connected between outputs of the demultiplexer element 47a and inputs of the multiplexer element 47b, and a light source, such as a semiconductor laser, for emitting different wavelengths of light (not shown). The demultiplexer element 47a splits a wavelength multiplexed light supplied from the optical matrix switch 45. The optical switches 47c deliver a desired wavelength of light to a switchboard 39e (and a subscriber 21e) and the other wavelengths to the multiplexer element 47b. When a signal is transmitted from the subscriber 21e to the optical communications network 31, the group of the optical switches 47c supply the multiplexer element 47b with a desired wavelength of light emitted from a source not shown. The multiplexer element 47b combines light inputs received at the input terminals and delivers a composite signal to the optical matrix switch 45.

Accordingly, a combination of the optical cross connector 45 and the add/drop unit 47 in the first arrangement of the second embodiment can communicate the subscriber 21e with the optical communications network.

Figure 5:
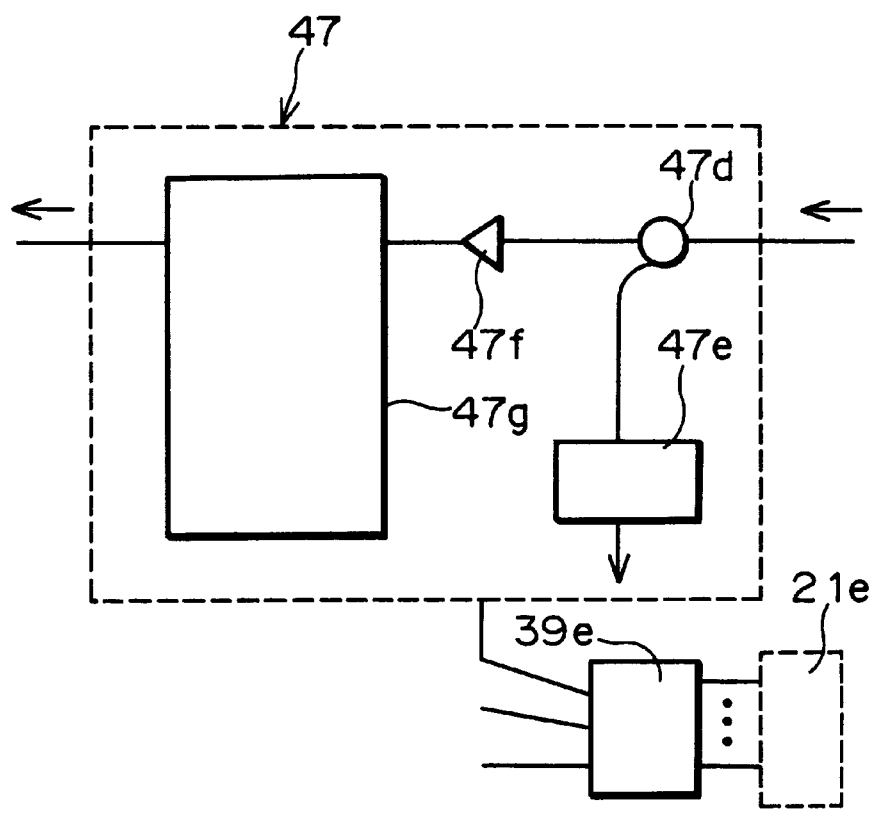
FIG. 5 is an explanatory view of the second embodiment of the present invention showing a second arrangement where an add/drop unit is mainly focused.

A second arrangement of the second embodiment is explained. The second arrangement includes a type of the add/drop unit suited for adding and dropping an optical signal of a wavelength multiplexed and packet multiplexed form. The type of the add/drop unit will be described referring to FIG. 5 in which the add/drop unit in the second arrangement of the optical communications system is mainly illustrated.

The add/drop unit 47 in the second arrangement of the second embodiment comprises a splitter 47d, a demultiplexer 47e, an amplifier 47f, and a switch 47g.

The splitter 47d splits an optical signal supplied from the optical cross connector 45 (See FIG. 4) into two components. One of the two components split by the splitter 47d is divided by the demultiplexer 47e into different wavelengths. A desired wavelength of the optical signal from a subscriber 21a is transmitted via a switchboard 39e to a subscriber 21e. The other component of the optical signal split by the splitter 47d is amplified by the amplifier 47f to its original power level and sent to the switch 47g. The switch 47g drops a particular packet in the optical signal and adds another packet received from the subscriber 21e for further transmission through the optical communications network. The second arrangement allows an optical signal of the wavelength multiplexed and packet multiplexed form to be routed and handled in the optical communications system.

The add/drop unit of the second arrangement is definitely depicted in Japanese Patent No. 2509332 to this applicant and will be explained in no more detail.

Figure 6A:
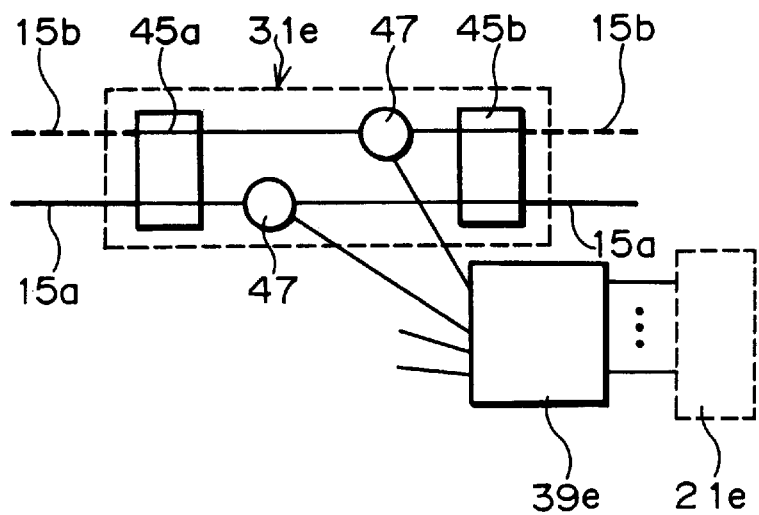
FIGS. 6(A) and 6(B) are an explanatory view of the second embodiment of the present invention showing a third arrangement where a node is mainly focused.
Figure 6B:
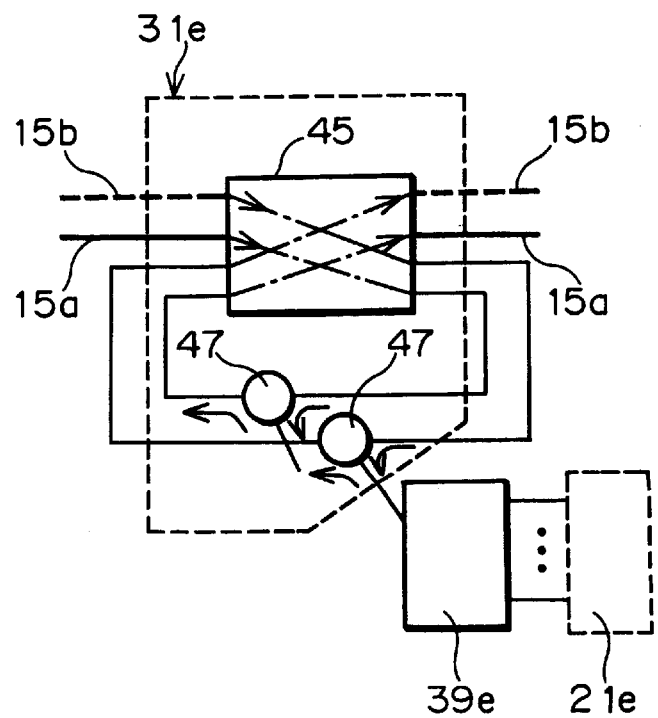

A third arrangement of the second embodiment is now explained. The third arrangement has a network of auxiliary optical fibers 15b provided as an effective, independent optical communications network for enhancing the use of optical fibers. This is explained in more detail referring to FIG. 6. FIGS. 6(A) and 6(B) illustrate the third arrangement of the second embodiment in an optical communications system where the nodes are concerned. For ease of the description, the node 31e is focused.

In the third arrangement of the second embodiment, an optical cross connector 45 is connected at each of its input and output sides to both an existing optical fiber 15a and an auxiliary optical fiber 15b. A couple of add/drop units 47 are connected between the two existing optical fibers 15a and between the two auxiliary optical fibers 15b respectively. The arrangement will be described below in more detail.

As shown in FIG. 6(A), the optical cross connector 45 comprises two matrix switches; an input side optical matrix switch 45a and an output side optical matrix switch 45b. The input side optical matrix switch 45a is connected at its input to the input side auxiliary optical fiber 15b and the existing optical fiber 15a. Similarly, the output side optical matrix switch 45b is connected at its output to the output side auxiliary optical fiber 15b and the existing optical fiber 15a. The connections of the optical matrix switches 45a and 45b are made so that the input and output side auxiliary optical fibers 15b are connected to each other and the input and output side existing optical fibers 15a are connected to each other. The add/drop units 47 connected between the two optical matrix switches 45a and 45b across the existing and auxiliary optical fibers are identical to that shown in FIG. 4.

FIG. 6(B) illustrates in which the two optical matrix switches 45a and 45b shown in FIG. 6(A) is substituted by a single optical matrix switch.

Both shown in FIGS. 6(A) and 6(B) exhibit that the existing and auxiliary optical fibers constitute two independent, effective optical fiber network links respectively. This will enhance the utilization of the optical fibers.

Third Embodiment

The first and second embodiments of the present invention are illustrated in the form of an optical communications system. A third and a fourth embodiment are described in the form of an optical cross connector used in the optical communications system.

More specifically, the optical cross connectors of the third and fourth embodiments can be used in the nodes of the optical communications system. The nodes in the optical communications system are provided for switching the optical signal according to its wavelength channel. For this purpose, the optical cross connector has a plurality of input ports and output ports, allowing a wavelength multiplexed optical signal to be received by each input port and switched to a corresponding output port depending on its wavelength (or wavelength channel). The optical cross connector switches the wavelength multiplexed optical signal to a desired path according to its wavelength channel.

Figure 7:
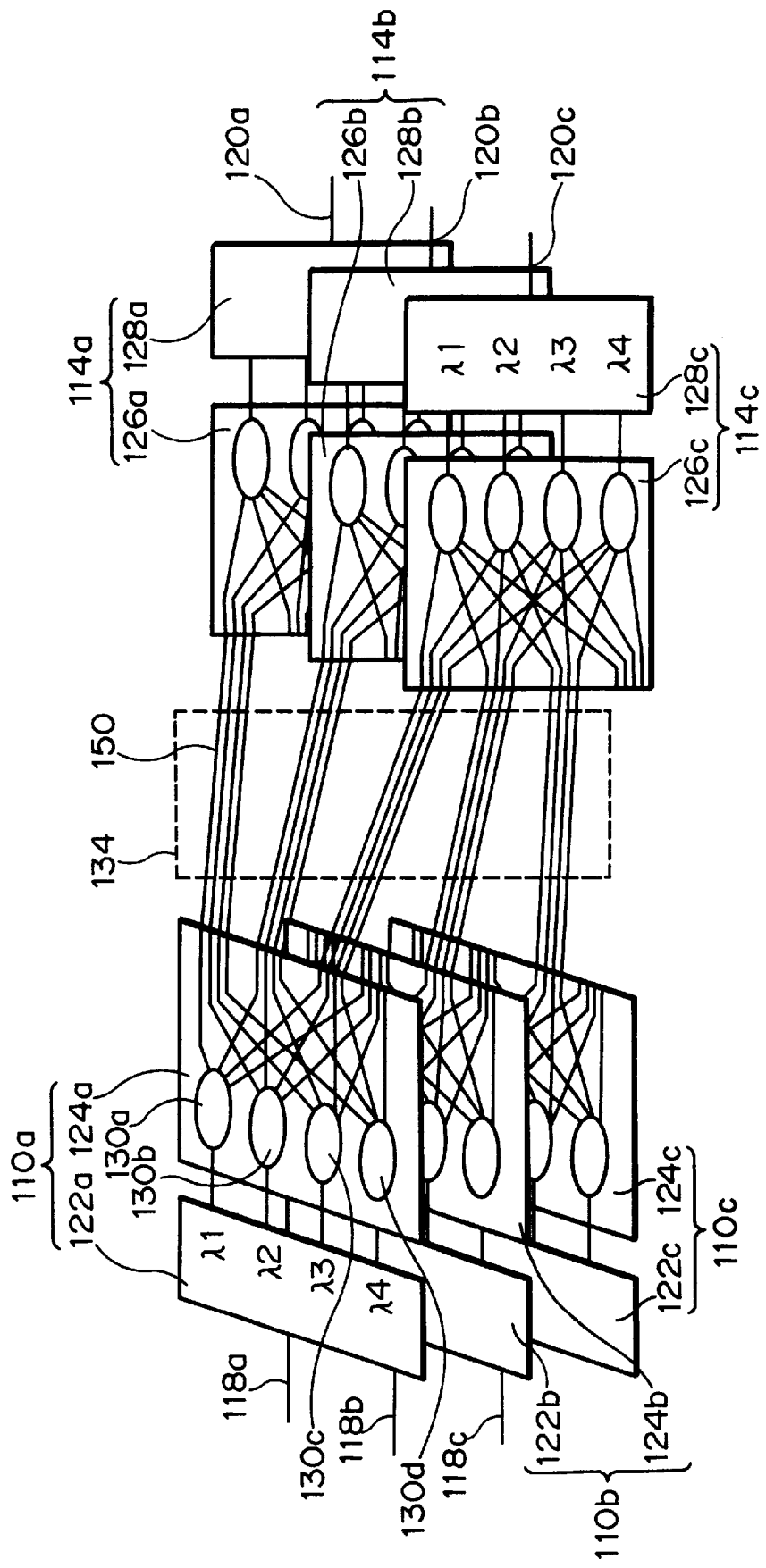
FIG. 7 is a view showing an arrangement of an optical cross connector apparatus showing a third embodiment of the present invention.
Figure 8:
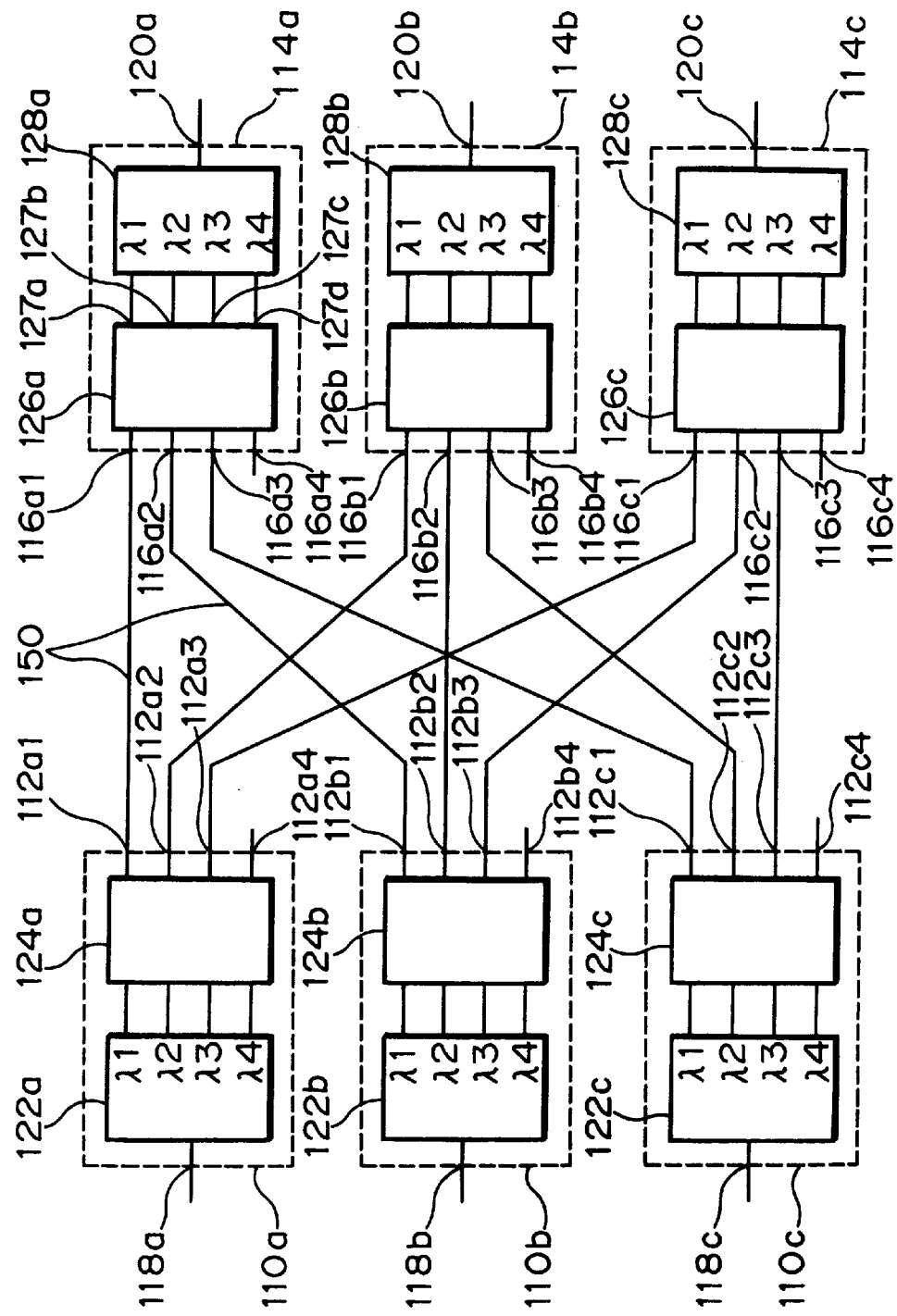
FIG. 8 is a view showing a connection between ports in the third embodiment.

A construction of the optical cross connector of the third embodiment will be explained. FIG. 7 is a schematic view showing the construction of the optical cross connector of this embodiment. The optical cross connector comprises input side units 110a, 110b, and 110c, output side units 114a, 114b, and 114c, and an optical connecting means 134 connected between the input side units and the output side units. FIG. 8 is a block diagram of the optical cross connector showing chiefly an example of connection between the ports. The input side units, the optical connecting means, and the output side units will be described in this order.

The input side units 110a, 110b, and 110c include first input ports 118a, 118b, and 118c, and first output ports 112a1 to 112a4, 112b1 to 112b4, and 112c1 to 112c4 respectively. In operation, a wavelength multiplexed optical signal received at the first input port is split into wavelength channels which are then distributed to the corresponding first output ports. The input side units 110a, 110b, and 110c also include demultiplexers 122a, 122b, and 122c and first optical switches 124a, 124b, and 124c respectively. For instance, the input side unit 110a includes the demultiplexer 122a and the first optical switch 124a.

The demultiplexers 122a to 122c demultiplex optical signals of a wavelength multiplexed form received by their respective first input ports 118a to 118c to have optical signal components, each having a single wavelength channel (FIG. 8). For example, the wavelength multiplexed optical signal received at the first input port 118a is demultiplexed by the demultiplexer 122a to wavelength channels. More specifically, the wavelength multiplexed optical signal comprising wavelength channels lambda 1, lambda 2, lambda 3, and lambda 4 is received at the first input port 118a and automatically split by the demultiplexer 122a to the wavelength channels lambda 1, lambda 2, lambda 3, and lambda 4. The demultiplexer 122a to 122c may be implemented by known grating elements.

The wavelength channels of the optical signals are selectively distributed by the first optical switches 124a, 124b, and 124c to the first output ports 112a1 to 112a4, 112b1 to 112b4, and 112c1 to 112c4. The four wavelength channels lambda 1, lambda 2, lambda 3, and lambda 4 of the optical signal received at the first input port 118a are distributed by the first optical switch 124a to their respective first output ports 112a1 to 112a4. For example, the wavelength channel lambda 1 is fed to the first output port 112a2, lambda 2 to 112a4, lambda 3 to 112a3, and lambda 4 to 112a1.

Figure 9:
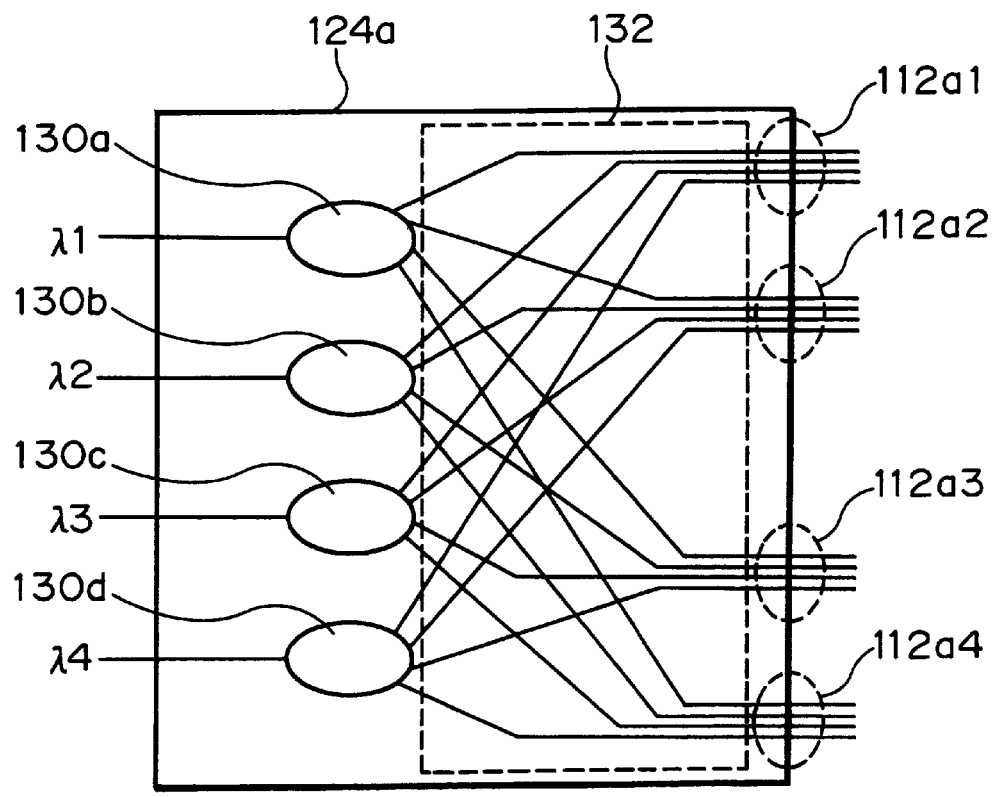
FIG. 9 is a view of an arrangement of a third optical switch applicable in the third embodiment.

The first optical switch 124a is explained in more detail. FIG. 9 is a plan view showing a construction of the first optical switch 124a which comprises a group of first optical switch stages 130a, 130b, 130c, and 130d corresponding to the number of the wavelength channels and a first optical link 132 connected between the first optical switch stages 130a to 130d and the first output ports 112a1 to 112a4. The first optical link 132 incorporates a network of optical paths extending between the first optical switch stages 130a to 130d and the first output ports 112a1 to 112a4. The first optical switch stages 130a to 130d are implemented by elements for selecting the paths of the wavelength channels lambda 1, lambda 2, lambda 3, and lambda 4 of the optical signal in the first optical link 132. In a normal mode, the first optical switch stages 130a to 130d are maintained at their initial switching states. The wavelength channels of the optical signal are semipermanently allocated to the first output ports respectively; for example, a segment of the optical signal fed to the first optical switch stage 130a is transmitted through the first output port 112a1.

Figure 10:
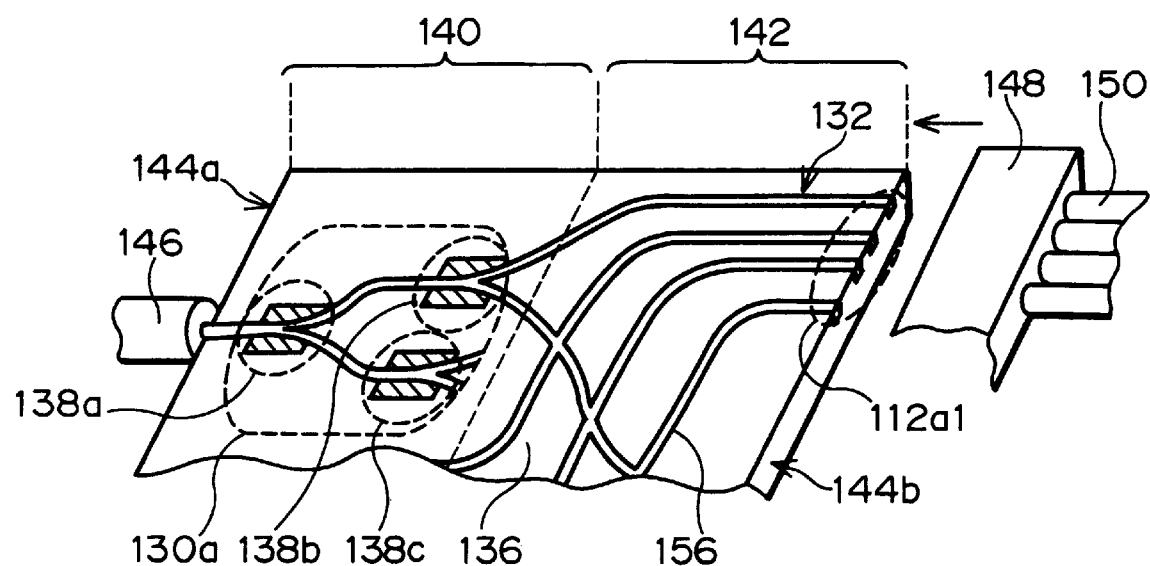
FIG. 10 is a view showing an optical switching action in the third embodiment.

FIG. 10 is a partially cut-off perspective view showing a primary part of the first optical switch 124a. The first optical switch 124a is mounted on a substrate 136. The upper surface of the substrate 136 is divided into an optical path switching area 140 and an optical routing area 142. The optical path switching area 140 includes the first optical switch stages 130a to 130d. The optical routing area 142 includes the first optical link 132. The substrate 136 has waveguides 156 provided thereon, each extending from one end 144a of the substrate 136 to the opposite end 144b as branching into two routes at proper locations. Optical switch elements are provided at the branching locations of each waveguide 156 in the optical switching area 140 thus constituting one of the first optical switch stages 130a to 130d.

More specifically, the waveguide 156 in the optical switching area 140 shown in FIG. 10 has three junctions where the path is formed into a Y shape. The three Y junctions are equipped with built-in optical switch elements 138a, 138b, and 138c respectively. The optical switch elements 138a to 138c may be Y-shaped optical switch for selecting one of two routes in response to a change in the field profile of light (such as shown in Appendix 2, "IEICE TRANS. COMMUM", Vol. E77-B, NO. 2. p. 202, 1994). The three optical switch elements 138a to 138c constitute the first optical switch stage 130a as a 1×4 optical switching unit having one input and four outputs.

The wavelength lambda 1 from the demultiplexer 122a is transmitted along an optical fiber 146 to the first optical switch stage 130a. The optical fiber 146 is joined by a stationary connector (not shown) to the one end 144a of the substrate 136. At the one end 144a of the substrate 136 where the optical fiber 146 is connected, a portion of the waveguide 156 is exposed. The incoming signal transmitted along the optical fiber 146 is received by the one end 144a of the substrate 136 and guided by the waveguide 156 to the optical switch element 138a.

The optical switch element 138a is located at the first Y junction of the waveguide 156 extending from the substrate end 144a. The route of transmission of the signal received from the optical fiber 146 is selectively determined by the optical switch element 138a. Each of the two routes along the waveguide 156 from optical switch element 138a at the first Y junction is then branched into two routes at the succeeding junction. The optical switch elements 138b and 138c are located at the two succeeding junctions respectively. The optical switch elements 138b and 138c allow the optical signal to run along their selected routes. In this manner, the optical signal can selectively be transmitted along four different routes of the waveguide 156 determined by the action of the optical switch elements 138a to 138c.

The waveguide 156 in the optical routing area 142 incorporates the first optical link 132. The first optical link 132 comprises portions of the waveguide 156 extending from the first optical switch stages 130a to 130d to the first output ports 112a1 to 112a4. The waveguide 156 has branch nodes in the optical switch elements 138b and 138c and extends to the first output ports 112a1 to 112a4 at the other end of the substrate 136 therefrom. Accordingly, the optical signal is transmitted to one of the first output ports 112a1 to 112a4 by the switching action of the first optical switch stage 130a.

The optical signal arriving at the first output ports 112a1 to 112a4 is further delivered along the optical connecting means 134 to the output side unit. In this arrangement, corresponding portions of the waveguide 156 are exposed at the first output ports 112a1 to 112a4 of the other substrate end 144b. The routes of the waveguide 156 extend from the first optical switch stages 130a to 130d to the first output ports 112a1 to 112a4. More particularly, each first output port at the other substrate end 144b receives four routes of the waveguide 156. The route ends of the waveguide 156 are connected to their respective optical fibers. In this embodiment, the four optical fibers are grouped to a bundle of fiber tape 150. The optical connecting means 134 is composed of a set of the fiber tapes 150 corresponding to the number of the first output ports. The fiber tape 150 is connected to each of the first output port 112a1 to 112a4. One end of the fiber tape 150 is joined by a stationary connector 148 to the exposed end of the waveguide 156 at the corresponding first output port.

The optical switching area 140 and the optical routing area 142 may be provided on the same substrate 136 or two separate substrates respectively. Preferably, the optical switching area 140 is arranged on a lithium niobate substrate while the optical routing area 142 is arranged on a glass substrate.

The optical connecting means 134 connects the first output ports 112a1 to 112a4, 112b1 to 112b4, and 112c1 to 112c4 to the second input ports 116a1 to 116a4, 116b1 to 116b4, and 116c1 to 116c4 respectively. In this embodiment, the first output port 112a1 of the input side unit 110a is connected by the fiber tape 150 of the optical connecting means 134 to the second input port 116a1 of the output side unit 114a. The optical connecting means 134 is not limited to that of the embodiment and may comprise waveguides instead of the fiber tape 150 or a bundle of the optical fibers.

It is not obligatory to connect the first output ports and the second input ports to each other by the optical connecting means 134. As shown in FIG. 8, the fourth port of each of the input side units 110a to 110c are not connected to the fourth port of corresponding one of the output side units 114a to 114c by the optical connecting means 134. Depending on the application, the fiber tapes 150 of the optical connecting means 134 can be used for connecting between the desired ports.

The output side units 114a to 114c are provided with the second input ports 116a1 to 116a4, 116b1 to 116b4, and 116c1 to 116c4 and the second output ports 120a to 120c for combining wavelengths of the optical signal received at the second input ports and transmitting a sum signal to the corresponding second output port. Each of the output side units 114a to 114c includes second optical switches 126a to 126c and multiplexers 128a to 128c. More specifically, the output side unit 114a comprises a second optical switch 126a and a multiplexer 128a.

In this embodiment, the second optical switch 126a has four third output ports 127a to 127d and distributes the wavelength channels of the optical signal received at their respective second input ports 116a1 to 116a4 to the third output ports 127a to 127d. The multiplexer 128a combines the wavelengths from the third output ports 127a to 127d to a multiplexed optical signal which is then released from the second output port 120a.

A construction of the second optical switch 126a is explained in mode detail. The second optical switch 126a includes a group of second optical switch stages corresponding to the number of wavelength channels and a second optical link provided between the second optical switch stages and the second input ports 116a1 to 116a4. The second optical link comprises a network of optical paths for transmitting the optical signal received at the second input ports 116a1 to 116a4 to the second optical switch stages according to its wavelength channel. The second optical switch stages are switching elements for combining the optical signals and delivering a sum signal to corresponding one of the third output port 127a to 127d.

In this embodiment, the second optical switches 126a to 126c are identical in construction to the first optical switches 124a to 124c. More specifically, the first output ports 112a1 to 112a4 of the first optical switch 124a shown in FIG. 9 serve as the second input ports 116a1 to 116a4 of the second optical switch 126a. Also, the first optical link 132 of the first optical switch 124a acts as the second optical link of the second optical switch 126a. The first optical switch stages 130a to 130d of the first optical switch 124a act as the second optical switch stages of the second optical switch 126a. Accordingly, the optical signals received at the input ports 116a1 to 116a4 are transmitted to the second optical switch stages depending on their wavelength channel. As the second optical switch stages are connected to the third output ports 127a to 127d, the optical signal of a specific wavelength channel is released from its corresponding one of the third output ports 127a to 127d. The specific wavelength channel of the optical signal is thus received by the corresponding port of the multiplexer 128a.

Figure 11:
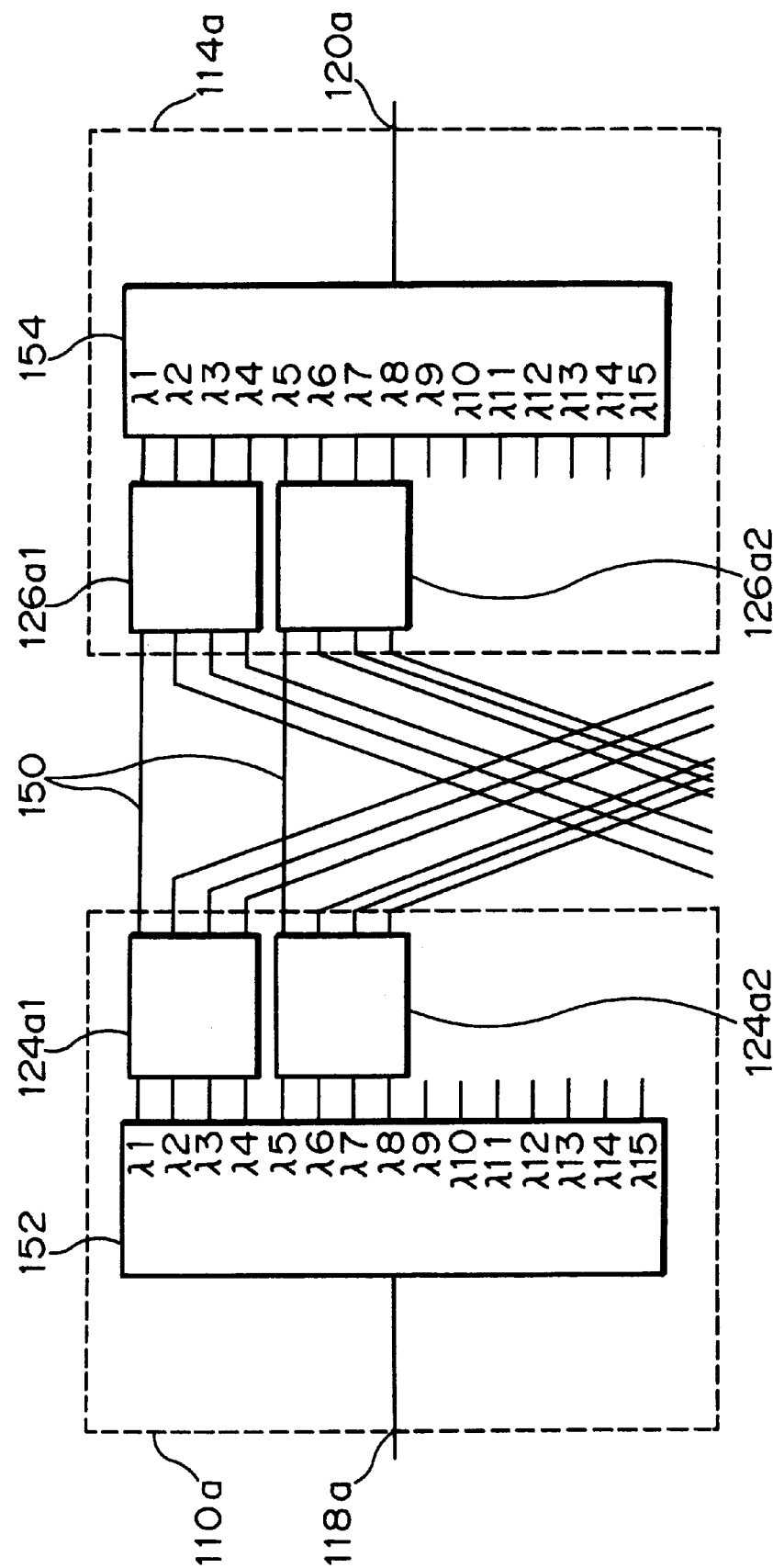
FIG. 11 is a view of a modification of the optical cross connector apparatus of the third embodiment where the number of wavelength channels is increased.

The number of the wavelength channels is not limited to four of the embodiment and may be increased when the arrangement is modified as explained below. FIG. 11 is a block diagram showing a modification of the arrangement in which more than four wavelength channels can be handled. The diagram illustrates the input side unit 110a and the output side unit 114a and the other units and components are omitted for ease of the explanation.

Figure 1:
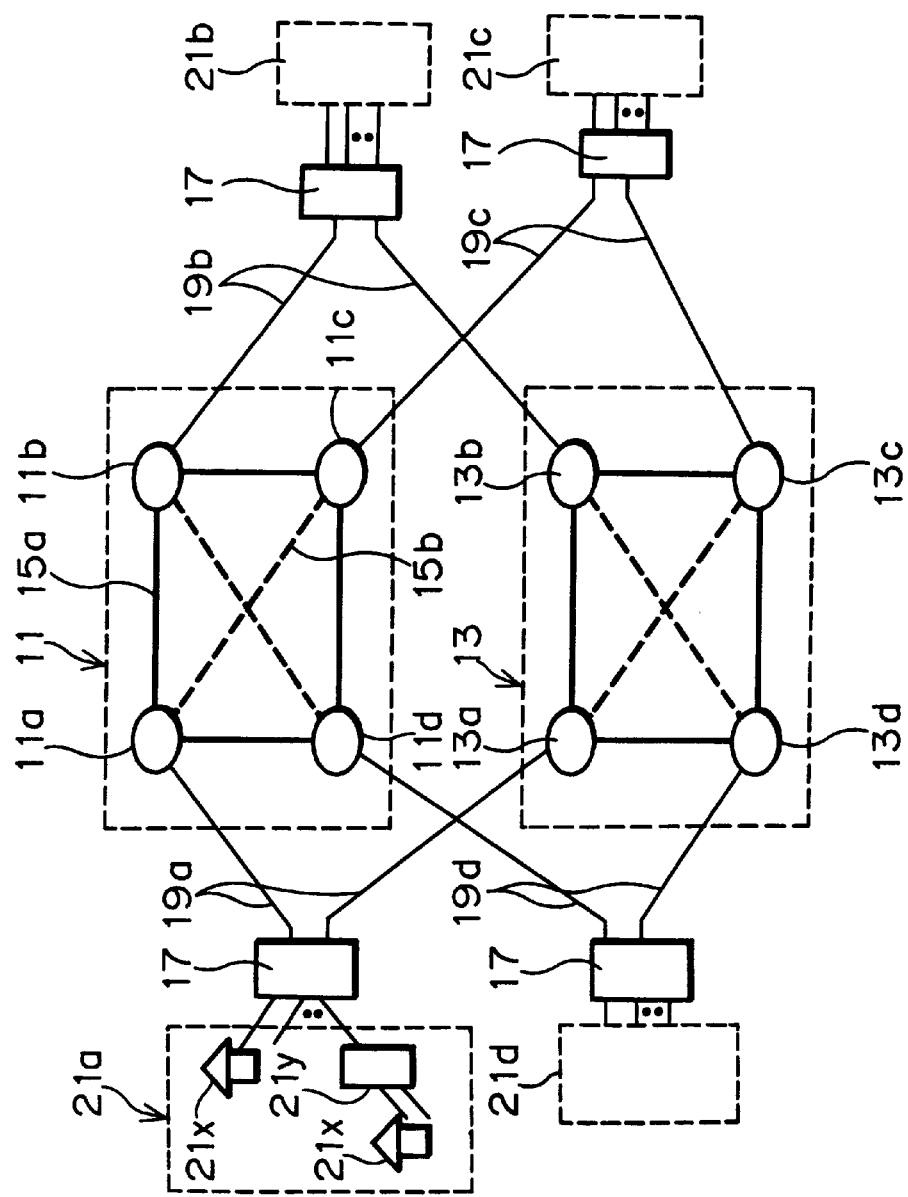
FIG. 1 is an explanatory view showing a function in an optical communications system according to the present invention.

The input side unit 110a shown in FIG. 11 is adapted in which the demultiplexer 122a shown in FIG. 1 or 8 is replaced by a demultiplexer 152 and the first optical switch 124a is replaced by a pair of first optical switches 124a1 and 124a2. The demultiplexer 152 separates a wavelength multiplexed optical signal received at the first input port 118a into fifteen wavelength channels lambda 1 of a single wavelength signal to lambda 15 which are then delivered from their respective ports. The two first optical switches 124a1 and 124a2 are identical in construction to the first optical switch 124a (FIG. 9). In the modification shown in FIG. 11, the four input ports of the first optical switch 124a1 are provided for receiving four wavelength channels lambda 1 to lambda 4 of the optical signal respectively. Also, the four input ports of the first optical switch 124a2 are provided for receiving four wavelength channels lambda 5 to lambda 8 respectively.

The output side unit 114a shown in FIG. 11 is adapted in which the multiplexer 128a shown in FIG. 1 or 8 is replaced by a multiplexer 154 and the second optical switch 126a is replaced by a pair of second optical switches 126a1 and 126a2. The two second optical switches 126a1 and 126a2 are identical in construction to the second optical switch 126a or the first optical switch 124a (FIG. 9). In the modification shown in FIG. 11, the four output ports of the second optical switch 126a1 are provided for releasing four wavelength channels lambda 1 to lambda 4 of the optical signal respectively. Also, the four output ports of the second optical switch 126a2 are provided for releasing four wavelength channels lambda 5 to lambda 8 respectively. The multiplexer 154 combines the wavelength channels released from the output ports of the second optical switches 126a1 and 126a2 to recover the multiplexed optical signal which is further delivered through the second output port 120a. The modification permits eight different wavelength channels of the optical signal to be handled. The number of wavelengths to be multiplexed can hence be increased.

It is usual at the beginning of service of the communication network to handle a minimum or less number of wavelength channels of optical signal. As the number of subscribers and the number of nodes increase with time, an additional number of wavelength channels is needed. In practice, the interval between two assigned wavelengths is generously saved in the beginning of service and then filled with the additional wavelengths as desired. Accordingly, the interval between any two adjacent wavelength channels will be shortened.

Figure 12:
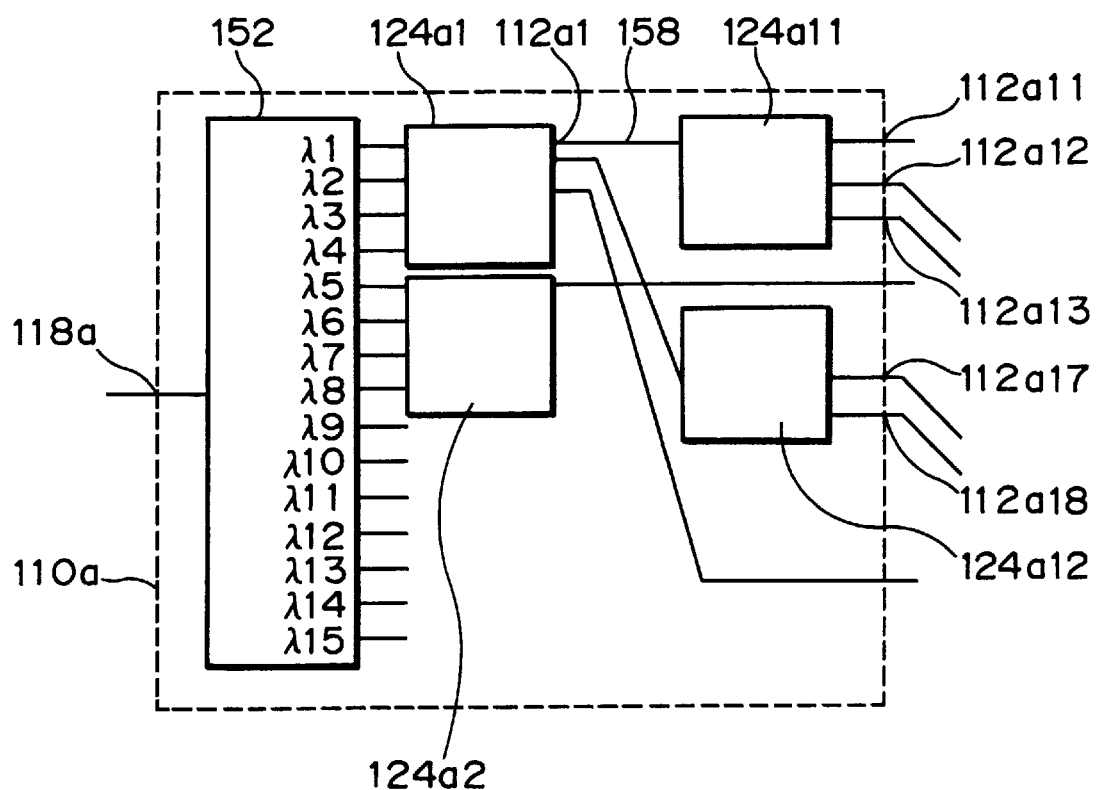
FIG. 12 is a view of a modification of the optical cross connector apparatus of the third embodiment where the number of ports is increased.
Figure 13:
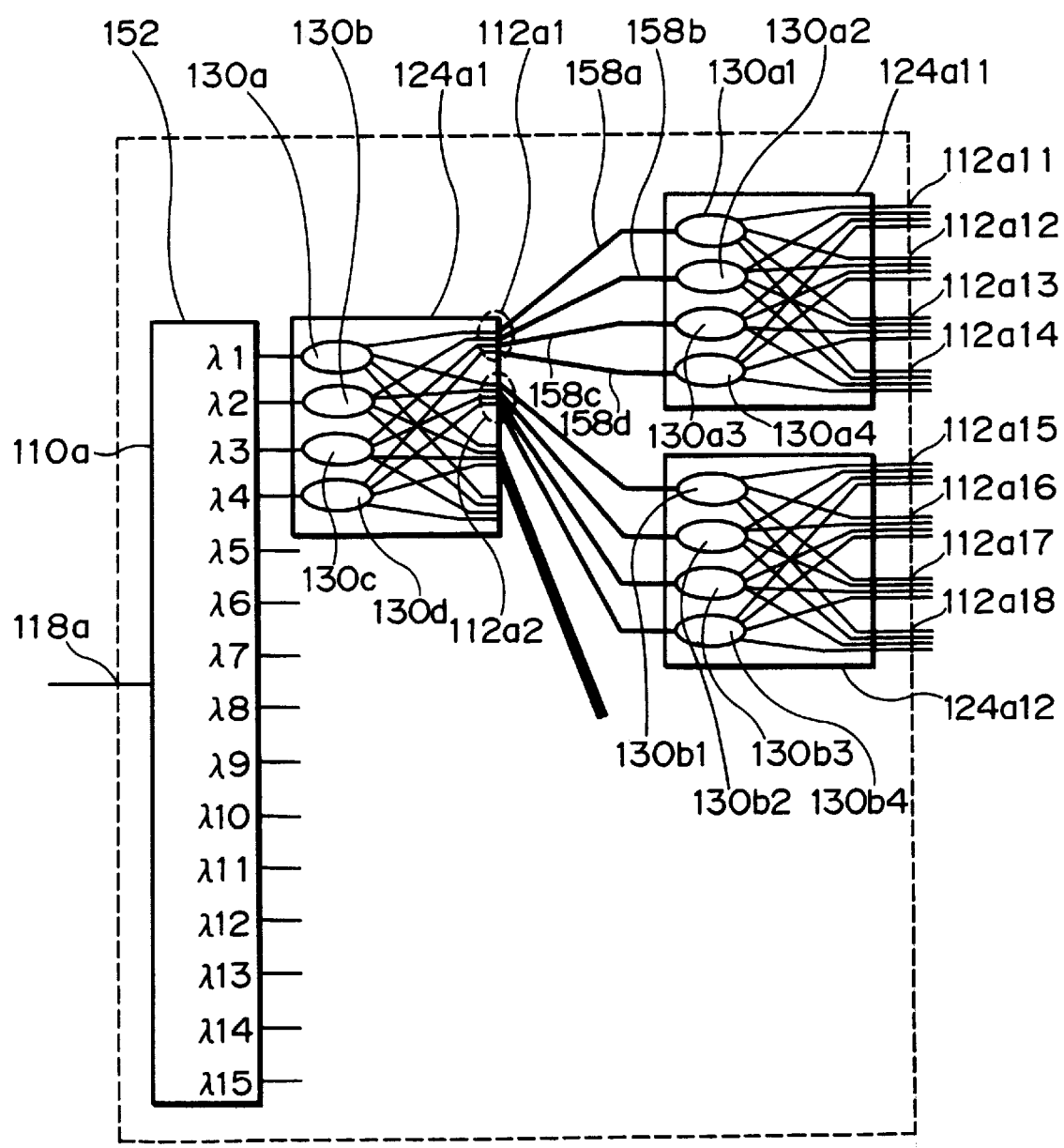
FIG. 13 is an enlarged view showing a primary part of the apparatus illustrated in FIG. 12.

The number of the first output ports of the input side units 110a to 110c as well as the number of the second input ports of the output side units 114a to 114c can be increased. FIG. 12 is a block diagram showing a modification in which the number of the first output ports is increased. FIG. 13 is a block diagram showing a primary part of the modification enlarged. Shown in FIGS. 12 and 13 is the input side unit 110a while the others are omitted.

In the modification shown in FIGS. 12 and 13, the first optical switch is arranged in two stages. While a demultiplexer 152 identical to that shown in FIG. 12 is provided at one side, the first optical switch includes a pair of first optical switches 124a1 and 124a2 at the first stage. Two output ports of the first optical switch 124a1 are connected to input ports of corresponding first optical switches 124a11 and 124a12 at the second stage. The first optical switches 124a11 and 124a12 are identical in construction to the first optical switch 124a1. More particularly, the output port 112a1 of the first optical switch 124a1 is connected to one end of an optical connecting means (a fiber tape) 158 which comprises four connecting waveguides 158a to 158d for transmitting four different wavelength channels lambda 1 to lambda 4 of the optical signal. The connecting waveguides 158a to 158d are connected at the other end to the input port of the first optical switch 124a11 or namely, inputs of corresponding first optical stages 130a1 to 130a4. The other output port 112a2 of the first optical switch 124a1 are also connected to four connecting waveguides which in turn communicate at the other end with corresponding first optical switch stages 130b1 to 130b4 of the first optical switch 124a12.

It is also favorable for ease of assembly to connect the demultiplexer 152 to the first optical switch stage 130a by a fiber tape like the optical connecting means 158.

Accordingly, the output port 112a1 of the first optical switch 124a1 is connected to the first output ports 112a11 to 112a14 of the first optical switch 124a11 while the output port 112a2 of the first optical switch 124a1 is connected to the first output ports 112a15 to 112a18 of the first optical switch 124a12. In other words, the output port of the first optical switch 124a1 is separated into two and six more output ports through the two first optical switches 124a11 and 124a12 at the second stage. The number of the first output ports of the input side unit 110a is thus increased. In common, when the first optical switch stage of the first optical switch employs 1×n switches (n being a natural number), the two-stage arrangement of the first optical switch claims $n^2$ of the first output ports.

As set forth above, the optical cross connector of the third embodiment selects the path of the multiplexed optical signal according to its wavelength channel. Since the optical cross connector of the embodiment unlike any conventional one employs no star couplers, distribution loss in the optical signal energy will be minimized thus having a smaller optical energy loss than that of the conventional one.

Assuming that the crosstalk in the demultiplexer and the first optical switch of the input side unit is Xm and Xs respectively, its counterpart in the output side unit is expressed by Xm·Xs. Also, when the crosstalk in the multiplexer and the second optical switch of the output side unit is Xm and Xs respectively, its counterpart in the output side unit is expressed by Xm·Xs. Accordingly, the entire crosstalk in the optical cross connector is expressed by (Xm·Xs)2 per input port.

For example, if both Xm and Xs are −15 dB, the entire crosstalk is −60 dB per input port. In the conventional construction shown in Appendix 1, the entire crosstalk is Xm·Xs equivalent to −30 dB per input port. Apparently, the entire crosstalk per input port in the construction of the present invention is smaller by 30 dB than that of the conventional construction. This allows the optical cross connector of the present invention to handle as a higher number as 1000 wavelength channels as compared with only two channels in the conventional one. According to the construction of the present invention, the crosstalk produced in the input side unit will substantially be eliminated in the output side unit, hence minimizing the entire crosstalk to a lower level than that of the conventional one.

It would be understood that the number of the input side units and the number of the output side units are not limited to those explained in the above embodiments. The first input ports and the second output ports may thus be determined in number as desired.

Fourth Embodiment

Figure 14:
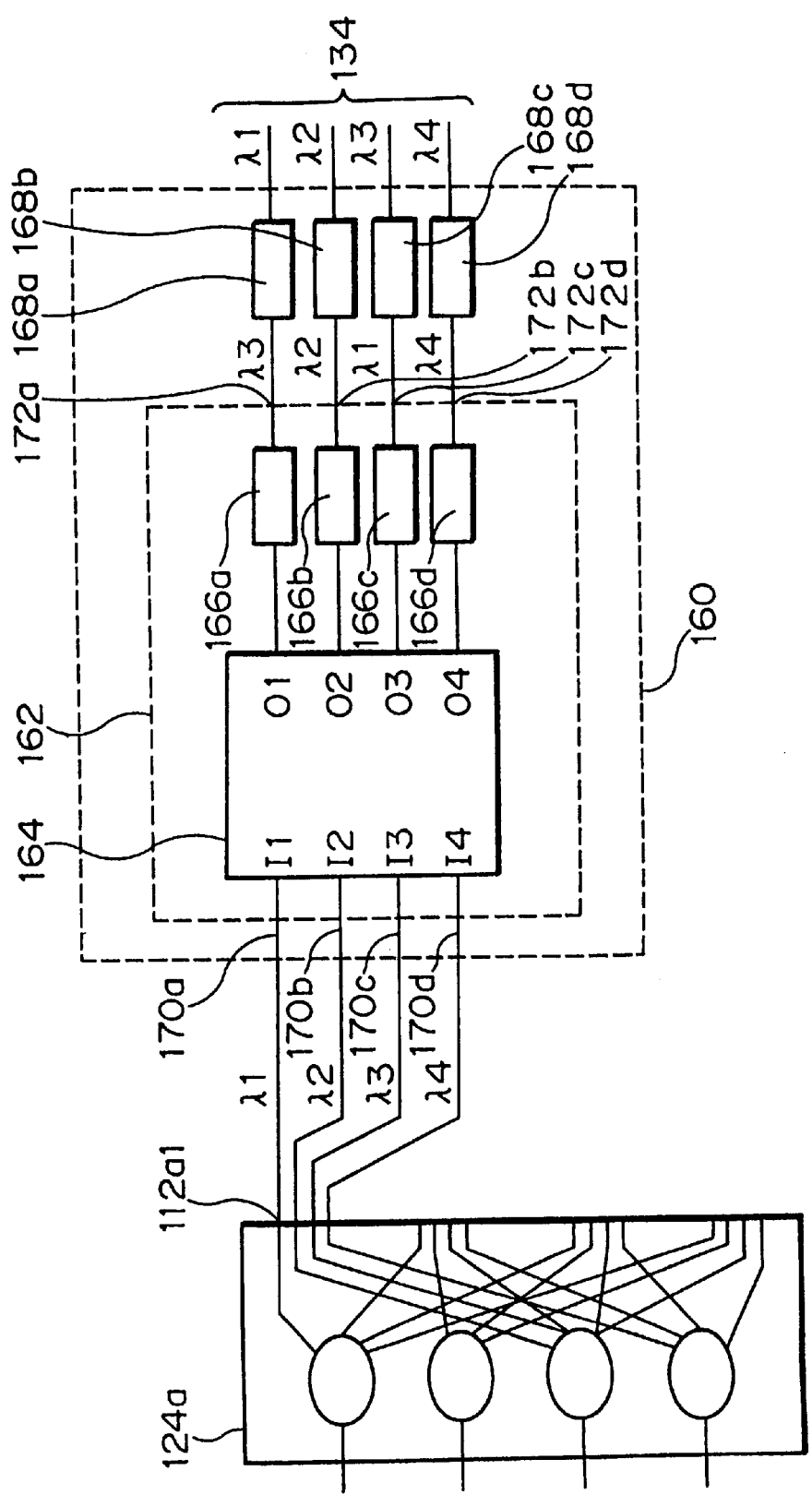
FIG. 14 is a view showing a fourth embodiment of the present invention.

A fourth embodiment of the optical cross connector will be described. FIG. 14 is a block diagram of the fourth embodiment in which a wavelength converter 160 is provided in the optical connecting means 134. In FIG. 14, the input side unit 124a, the optical connecting means 134, and the wavelength converter 160 are illustrated but the other components are not for ease of the description.

The wavelength converter 160 comprises a wavelength router 162 and a group of wavelength converter elements 168a to 168d. The wavelength router 162 is provided for switching the path of the optical signal in the optical connecting means 134 according to its wavelength channel. The wavelength router 162 includes four input ports 170a to 170d. The input ports 170a to 170d are connected to the first input port 112a1 by the fiber tape 150 of the optical connecting means 134. The four wavelengths lambda 1 to lambda 4 are supplied from the first output port 112a1 of the first optical switch 124a to the four input ports 170a to 170d respectively. The wavelength router 162 also includes four output ports 172a to 172d for releasing the wavelengths in a different order of the input ports 170a to 170d.

A construction of the wavelength router 162 is explained in more detail. The wavelength router 162 includes a star coupler 164 for multiplexing the wavelengths of each channel of the optical signal transmitted through the optical connecting means 134. The star coupler 164 combines the wavelengths lambda 1 to lambda 4 received at the input ports 170a to 170d of the wavelength router 164 or its inputs I1 to I4.

The wavelength router 162 also includes a group of optical wavelength filters 166a to 166d. Each of the optical wavelength filters 166a to 166d selects and passes a corresponding channel of the wavelengths of the optical signal combined by the star coupler 164. The optical wavelength filters 166a to 166d are connected to four output ports 01 to 04 of the star coupler 164 respectively.

For example, the optical wavelength filter 166a connected to the output port 01 selects and passes the wavelength lambda 3. Equally, the optical wavelength filter 166b connected to the output port 02 selects and passes the wavelength lambda 2, the optical wavelength filter 166c connected to the output port 03 selects and passes the wavelength lambda 1, and the optical wavelength filter 166d connected to the output port 04 selects and passes the wavelength lambda 4.

The wavelength router 162 may be an optical matrix switch. More specifically, a 4×4 matrix switch with four inputs 170a to 170d and four outputs 172a to 172d can substitute the wavelength router 162 of FIG. 14. In this case, the spatial connection between the inputs 170a to 170d and the outputs 172a to 172d is predetermined according to the wavelength channels. The optical matrix switch eliminates the star coupler and will thus minimize the distribution loss of light energy.

At the downstream of the output ports 172a to 172d of the wavelength router 162 or the optical wavelength filters 166a to 166d, four wavelength converter elements 168a to 168b are connected respectively. The wavelength converter elements 168a to 168d are provided for converting the wavelength outputs of the wavelength router 162 to fixed wavelengths. For example, the wavelength converter element 168a converts the wavelength output lambda 3 of the optical signal of the output port 172a to lambda 1. Also, the wavelength converter element 168b converts the wavelength output lambda 2 of the output port 172b to lambda 2 or transmits it directly. While the wavelength converter element 168c converts the wavelength output lambda 1 of the output port 172c to lambda 3, the wavelength converter element 168d converts the wavelength output lambda 4 of the output port 172d to lambda 4 or transmits it directly.

Figure 15:
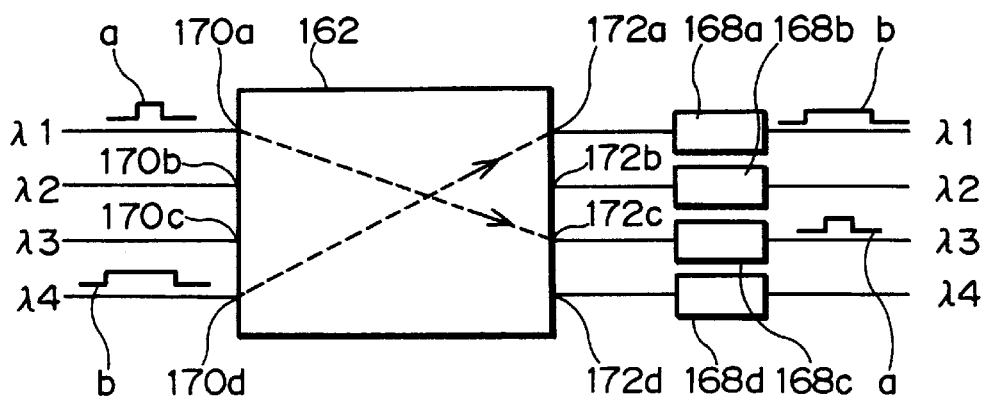
FIG. 15 is an explanatory view showing an action of a wavelength converter applicable in the fourth embodiment.

Accordingly, the wavelength channel can be shifted. In other words, the route of the wavelength channel of the optical signal in the optical connecting means 134 can hence be changed. FIG. 15 is a block diagram showing the action of the wavelength converter 160. It is assumed that the wavelength lambda 1 of an optical signal a is supplied to the input port 170a of the wavelength router 162 and released from the output port 172c of the same. The optical signal a is passed through the wavelength converter element 168c and its wavelength lambda 1 is turned to lambda 3. Accordingly, the optical signal a is converted in the wavelength. When an optical signal b of the wavelength lambda 4 is supplied to the input port 170d of the wavelength router 162 and it runs to the output port 172a, the optical signal b is then passed through the wavelength converter element 168a and its wavelength lambda 4 is turned to lambda 1. Accordingly, the optical signal b is changed in the wavelength.

Figure 16:
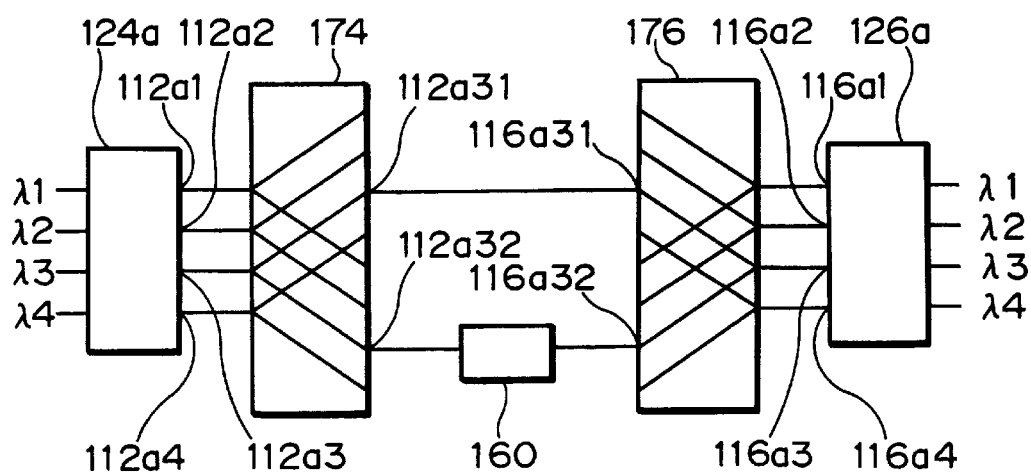
FIG. 16 is a view showing a modification of the fourth embodiment.

FIG. 16 is a diagram showing a preferred arrangement with the wavelength converter 160. Each output port of the first optical switch 124a is associated with a junction means 174 such as an optical switch or a coupler for separating into two routes. The junction means 174 separates the route of each of the wavelengths lambda 1 to lambda 4 from the output port 112a3 into two extending to a pair of output ports 112a31 and 112a32. The second optical switch 126a has two input ports which are provided by means of the optical coupler 176. For example, the input port 116a3 is divided to a input port 116a31 and 116a32 by the optical coupler 176. The wavelengths lambda 1 to lambda 4 respectively running across the input ports 116*a*31 and 116*a*32 are then coupled by a coupler means 176 and released from an input port 116*a*3. The junction means 174 and the coupler means 176 may be implemented by optical switches and waveguides.

The output and input ports are connected to each other by two links of the optical connecting means 134. The wavelength converter 160 is connected across one link of the optical connecting means 134 but not in the other. More specifically, the wavelength converter 160 is connected between the output port 112*a*32 and the input port 116*a*32 but not between the output port 112*a*31 and the input port 116*a*31. This will increase the number of wavelength channels to be handled and also decrease the number of the wavelength converters 160 to be installed.

As set forth above, the optical communications system of the present invention includes a plurality of the optical communications networks, each optical communication network having nodes and optical fibers connected between the nodes. In particular, the optical fibers in the optical communications network includes a group of existing optical fibers which construct a predetermined form of topology and a group of auxiliary optical fibers which are provided for altering the topology to a desired form. In addition, at least one or more switchboards are connected at one end to at least two or more of the optical communications networks via at least one node for each optical communications network, and at the other end to a subscriber(s) for selectively communicating the subscriber with any of the optical communications networks.

Each the optical communications network is isolated by the switchboard from the system and thus has a degree of independency. This allows a single wavelength of optical signal to be used for optical multiplex communication. Accordingly, the optical communications networks can successfully be linked establishing a large scale optical communications system with the use of a less number of information carrying factors.

When a corresponding number of the auxiliary optical fibers are enabled or turned to the existing optical fibers, the topology is shifted to a form suited for desired application. The optical communications system of the present invention will thus be flexible for meeting various designs of the network construction.

As set forth above, the optical cross connector of the present invention has an input side unit including a first input port and a group of first output ports. The input side unit splits an optical signal of a wavelength multiplexed format received by the first input port into wavelength channels which are then distributed to their respective first output ports. Also, an output side unit is provided including a group of second input ports and a second output port so that the wavelength channels of the optical signal received by the corresponding second input ports are combined and released from the second output port. The first output port is separately connected by an optical connecting means to each corresponding one of the second input ports. The input side unit comprises a demultiplexer for splitting the optical signal of a wavelength multiplexed format into wavelength channels and a first optical switch for selectively distributing the wavelength channels of the optical signal to the first output ports. The output side unit comprises a second optical switch having third output ports for selectively distributing the wavelength channels of the optical signal received at the second input ports to the third output ports, and a multiplexer for combining the wavelength channels of the optical signal from the third output ports before further transmitting out from a second output port.

This allows the multiplexed optical signal to be received by the first input port and split to the wavelength channels by the demultiplexer. The wavelength channels split by the demultiplexer are distributed by the action of the first optical switch to the corresponding first output ports respectively. More particularly, the wavelength channels of the optical signal split can thus be switched and transmitted to the corresponding first output ports respectively.

Each of the first output ports is also connected by the optical connecting means to its corresponding second input port of each output side unit on a one-to-one basis. Accordingly, the channel of the optical signal can be transmitted to the corresponding second input port.

The wavelength channels of the optical signal are then distributed by the action of the second optical switch from the second input ports to the third output ports respectively. The wavelength channels released from their respective third output ports are combined again by the multiplexer and further transmitted from the second output port. The wavelength channels of the optical signal received at the second input ports are combined before released from the second output port.

This allows the multiplexed optical signal of each channel to be selectively routed. The arrangement has no star coupler thus hardly creating the distribution loss derived mainly from the start coupler. Accordingly, the loss of light energy will be minimized as compared with the conventional arrangement.

In addition, the crosstalk produced in the input side unit can be eliminated in the output side unit and its adverse effect will be minimized.

In the optical cross connector of the present invention, the first optical switch comprises a number of first optical switch stages corresponding to the number of wavelength channels and a first optical link provided between the first optical switch stages and the first output ports. The first optical link incorporates optical paths extending between the first optical switch stages and the first output ports. The first optical switch stages is adapted for selecting one of the paths in the first optical link to transmit each wavelength channel of the optical signal.

The first optical switch includes the first optical switch stages corresponding to the number of wavelength channels of the optical signal. The wavelength channels of the optical signal split by the demultiplexer element is transmitted to the first optical switch where they are routed by the action of the first optical switch stages. The optical paths in the first optical link are connected between the first optical-switch stages and the first output ports. Each particular wavelength channel is routed by the action of the first optical switch stages to run through its optimum path in the first optical link to its corresponding first output port. Accordingly, the optical signals are selectively distributed to their respective first output ports corresponding to its wavelength channels.

The first output ports are connected to a number of paths corresponding to the number of wavelength channels. The optical connecting means is selected from a fiber optic ribbon, fiber optic tape, and a bundle of optical fibers. Accordingly, the optical cross connector can be assembled with much ease.

The second optical switch in the optical cross connector of the present invention comprise a number of second optical switch stages corresponding to the number of wavelength channels and a second optical link provided between the second optical switch stages and the second input ports. The second optical link incorporates optical paths for transmitting the wavelength channels of the optical signal to the corresponding second optical switch stages which in turn selects and delivers the wavelength channels from the third output ports.

The optical paths of the second optical link extend from the second input ports to the second optical switch stages. The number of the second optical switch stages is identical to that of the wavelength channels of the optical signal. This allows each wavelength channel of the optical signal to be received at its corresponding second input port and transmitted to its corresponding second optical switch stage. The wavelength channel is then routed by the action of the second optical switch stage to the third output port. Accordingly, the wavelength channels of the optical signal are selectively distributed to the corresponding third output ports.

The second input ports are connected to a number of optical paths corresponding to the number of wavelength channels. The optical connecting means is selected from a fiber optic ribbon, a fiber optic tape, and a bundle of optical fibers. Accordingly, the optical cross connector can be assembled with much ease.

In the optical cross connector of the present invention, a wavelength converter is provided in the optical connecting means. This allows the wavelength channel to be shifted in the optical connecting means.

Also, the wavelength converter in the optical cross connector of the present invention comprises a wavelength router for switching the wavelength channels of the optical signal transmitted across the optical connecting means to their respective routes and a group of wavelength converter elements for converting the wavelength channels of the optical signal routed by the wavelength router to fixed wavelengths.

Accordingly, the wavelength channels of the optical signal are routed by the action of the wavelength router to run their optimum paths in the optical connecting means. The paths are optical paths defined in the optical connecting means. More particularly, through a selecting action of the wavelength router, each wavelength channel of the optical signal can thus be transmitted not to its corresponding one but to another of the second input ports. Also, the wavelength channel of which route is determined by the wavelength router is converted by the wavelength converter to a predetermined wavelength channel. Accordingly, the wavelength channel of the optical signal can be shifted.

The wavelength router in the optical cross connector of the present invention comprises a star coupler for multiplexing the wavelengths of each channel of the optical signal transmitted across the optical connecting means and a group of optical wavelength filters for passing predetermined wavelength channels of the multiplexed optical signal supplied from the star coupler.

In action, the star coupler is supplied at its input with the different wavelengths of the optical signal which are then combined. As the result, the wavelength multiplexed optical signal of each wavelength channel is released from the corresponding output port of the star coupler. The optical wavelength filter selects and passes a particular wavelength channel of the multiplexed optical signal. The optical wavelength filters are connected to their respective output ports of the star coupler. Accordingly, the path of the optical signal across the optical connecting means can be selected according to its wavelength channel.

When the wavelength router in the optical cross connector of the present invention is comprised of an optical matrix switch, the path of the optical signal in the optical connecting means can be selected according to the wavelength channel. In addition, no star coupler is used and the distribution loss of light energy will be minimized.

The optical connecting means in the optical cross connector of the present invention is comprised of a bundle of optical fibers. As described above, different wavelength channels of the optical signal released from their respective output ports are transmitted to the corresponding second input ports via the optical connecting means which is thus preferably a fiber optic ribbon, a fiber optic tape, or a bundle of optical fibers. This will facilitate the assembly of the optical cross connector.

The entire disclosure of Japanese Patent Application No. 9-68606 filed on Mar. 21, 1997 and Japanese Patent Application No. 9-117185 filed on May 7, 1997 including specifications, claims, drawings and summaries are incorporated herein by reference in their entirety.

What is claimed is:

1. An optical communications system for performing communications with an optical signal of a predetermined multiplexed format, comprising:
   a plurality of optical communications mesh networks, each including a group of nodes having a signal path switching function and optical fibers connected between the nodes; and
   at least one or more switchboards connected at one end to at least two or more of the optical communications mesh networks via at least one node for each optical communications mesh network, and at the other end to a subscriber(s) for selectively communicating the subscriber with any of the optical communications mesh networks, said optical fibers including (a) existing optical fibers which constitute a topology assigned to the optical communications mesh network and (b) auxiliary optical fibers provided for changing the topology upon being enabled by the signal path switching functions of their corresponding node, said topology is a ring or bus topology.

2. An optical communications system according to claim 1, wherein the optical communications mesh networks are identical in the number of the nodes and each of the switchboards is connected to a particular one of the nodes in the optical communications mesh network, wherein when the switchboards are two or more in number, the switchboards are not connected to the same node in the optical communications mesh network.

3. An optical communications system according to claim 1, wherein the node comprises:
   an optical cross connector operable to switch the path of the multiplexed optical signal at the node; and
   an add/drop unit connected between the optical cross connector and the optical switchboard operable to receive from the subscriber an optical signal of the multiplexed format which is then transmitted to the optical cross connector and to distribute to the subscriber a particular component of the multiplexed optical signal assigned to the node.

4. An optical communications system according to claim 3, wherein the optical cross connector is operable to select the path of the optical signal according to its switching factor defined by the multiplexed format.

5. An optical communications system according to claim 3, wherein the optical cross connector comprises a plurality of demultiplexer elements, a plurality of multiplexer elements, a group of output ports for the demultiplexer elements, a group of input ports for the multiplexer elements and an optical matrix switch for controlling the connection with the add/drop unit.

6. An optical communications system according to claim 3, wherein the optical cross connector is an M×N optical matrix switch having input ports and output ports thereof so that the add/drop unit is connected between one of the input ports and one of the output ports where M and N are integers of 2 or higher.

7. An optical communications system according to claim 1, wherein a section of the optical communications network which is composed of the auxiliary optical fibers constitutes an independent network.

8. An optical communications system according to claim 1, wherein the optical communications network has a ring or bus network configuration.

* * * * *